(12) United States Patent
Hajjar et al.

(10) Patent No.: US 8,169,454 B1
(45) Date of Patent: May 1, 2012

(54) PATTERNING A SURFACE USING PRE-OBJECTIVE AND POST-OBJECTIVE RASTER SCANNING SYSTEMS

(75) Inventors: Roger A. Hajjar, San Jose, CA (US); Amit Jain, Sunnyvale, CA (US)

(73) Assignee: Prysm, Inc., San Jose, CA (US)

( * ) Notice: Subject to any disclaimer, the term of this patent is extended or adjusted under 35 U.S.C. 154(b) by 998 days.

(21) Appl. No.: 12/099,147

(22) Filed: Apr. 7, 2008

Related U.S. Application Data

(60) Provisional application No. 60/910,644, filed on Apr. 6, 2007, provisional application No. 60/938,687, filed on May 17, 2007.

(51) Int. Cl.
*B41J 2/435* (2006.01)
*B41J 2/47* (2006.01)

(52) U.S. Cl. .................. 347/235; 347/250

(58) Field of Classification Search .......... 347/231, 347/241–244, 256–261, 237, 246, 247, 229, 347/235–236, 248–250
See application file for complete search history.

(56) References Cited

U.S. PATENT DOCUMENTS

| | | | |
|---|---|---|---|
| 3,025,161 A | 3/1962 | Thaddeus | |
| 3,556,637 A | 6/1968 | Palmquist | |
| 3,691,482 A | 9/1972 | Pinnow et al. | |
| 3,701,999 A | * 10/1972 | David B. Congleton et al. ................ | 347/260 |
| 3,750,189 A | 7/1973 | Fleischer | |
| 4,165,154 A | 8/1979 | Takahashi | |
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,816,920 A | 3/1989 | Paulsen | |
| 4,923,262 A | 5/1990 | Clay | |
| 4,979,030 A | 12/1990 | Murata | |
| 5,080,467 A | 1/1992 | Kahn et al. | |
| 5,089,907 A | 2/1992 | Yoshikawa et al. | |
| 5,094,788 A | 3/1992 | Schrenk et al. | |
| 5,122,905 A | 6/1992 | Wheatley et al. | |
| 5,136,426 A | 8/1992 | Linden et al. | |
| 5,138,441 A | 8/1992 | Tanaka | |

(Continued)

FOREIGN PATENT DOCUMENTS

DE 10044603 4/2001

(Continued)

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

(Continued)

*Primary Examiner* — Hai C Pham
(74) *Attorney, Agent, or Firm* — Perkins Coie LLP

(57) ABSTRACT

Scanning beam systems in both pre-objective and post-objective designs for display, printing and other applications. Various servo feedback control mechanisms are described to control display imaging qualities on fluorescent screens that emit fluorescent light to form images or a target surface of a printing medium or other objects.

8 Claims, 18 Drawing Sheets

U.S. PATENT DOCUMENTS

| | | | |
|---|---|---|---|
| 5,140,604 A | 8/1992 | Alablanche et al. |
| 5,166,944 A | 11/1992 | Conemac |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,365,288 A | 11/1994 | Dewald et al. |
| 5,389,324 A | 2/1995 | Lewis et al. |
| 5,414,521 A | 5/1995 | Ansley |
| 5,473,396 A | 12/1995 | Okajima et al. |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,698,857 A | 12/1997 | Lambert et al. |
| 5,715,021 A | 2/1998 | Gibeau et al. |
| 5,716,118 A | 2/1998 | Sato et al. |
| 5,818,546 A * | 10/1998 | Opower et al. ............... 348/750 |
| 5,870,224 A | 2/1999 | Saitoh et al. |
| 5,882,774 A | 3/1999 | Jonza et al. |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker |
| 6,226,126 B1 | 5/2001 | Conemac |
| 6,252,254 B1 | 6/2001 | Soules et al. |
| 6,255,670 B1 | 7/2001 | Srivastava et al. |
| 6,276,802 B1 | 8/2001 | Naito |
| 6,288,817 B2 | 9/2001 | Rowe |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,800,844 B2 * | 10/2004 | Kandori et al. ............... 250/234 |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,986,581 B2 | 1/2006 | Sun et al. |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,181,417 B1 | 2/2007 | Langseth et al. |
| 7,213,923 B2 | 5/2007 | Liu et al. |
| 7,230,767 B2 | 6/2007 | Walck et al. |
| 7,239,436 B2 | 7/2007 | Orttinger et al. |
| 7,283,301 B2 | 10/2007 | Peeters et al. |
| 7,302,174 B2 | 11/2007 | Tan et al. |
| 2001/0050371 A1 | 12/2001 | Odaki et al. |
| 2002/0003233 A1 | 1/2002 | Mueller-Mach et al. |
| 2002/0008854 A1 | 1/2002 | Leigh Travis |
| 2002/0024495 A1 | 2/2002 | Lippert et al. |
| 2002/0050963 A1 | 5/2002 | Conemac et al. |
| 2002/0122260 A1 | 9/2002 | Okazaki et al. |
| 2002/0124250 A1 | 9/2002 | Proehl et al. |
| 2002/0145685 A1 | 10/2002 | Mueller-Mach et al. |
| 2002/0163702 A1 | 11/2002 | Hori et al. |
| 2002/0185965 A1 | 12/2002 | Collins et al. |
| 2003/0094893 A1 | 5/2003 | Ellens et al. |
| 2003/0184209 A1 | 10/2003 | Russ et al. |
| 2003/0184531 A1 | 10/2003 | Morikawa et al. |
| 2003/0184842 A1 | 10/2003 | Morikawa et al. |
| 2004/0027465 A1 | 2/2004 | Smith et al. |
| 2004/0070551 A1 | 4/2004 | Walck et al. |
| 2004/0145312 A1 | 7/2004 | Ouderkirk et al. |
| 2004/0156079 A1 | 8/2004 | Marshall et al. |
| 2004/0160516 A1 | 8/2004 | Ford |
| 2004/0165642 A1 | 8/2004 | Lamont |
| 2004/0184123 A1 | 9/2004 | Moikawa et al. |
| 2004/0227465 A1 | 11/2004 | Menkara et al. |
| 2004/0263074 A1 | 12/2004 | Baroky et al. |
| 2005/0001225 A1 | 1/2005 | Yoshimura et al. |
| 2005/0012446 A1 | 1/2005 | Jermann et al. |
| 2005/0023962 A1 | 2/2005 | Menkara et al. |
| 2005/0023963 A1 | 2/2005 | Menkara et al. |
| 2005/0051790 A1 | 3/2005 | Ueda |
| 2005/0093818 A1 | 5/2005 | Hatam-Tabrizi et al. |
| 2005/0094266 A1 | 5/2005 | Liu et al. |
| 2006/0066508 A1 | 3/2006 | Walck et al. |
| 2006/0081793 A1 | 4/2006 | Nesterovic et al. |
| 2006/0082873 A1 | 4/2006 | Allen et al. |
| 2006/0132021 A1 | 6/2006 | Naberhuis et al. |
| 2006/0221021 A1 | 10/2006 | Hajjar et al. |
| 2006/0227087 A1 | 10/2006 | Hajjar et al. |
| 2006/0262243 A1 | 11/2006 | Lester et al. |
| 2007/0014318 A1 | 1/2007 | Hajjar et al. |
| 2007/0183466 A1 | 8/2007 | Son et al. |
| 2007/0187580 A1 | 8/2007 | Kykta et al. |
| 2007/0187616 A1 | 8/2007 | Burroughs et al. |
| 2007/0188417 A1 | 8/2007 | Hajjar et al. |
| 2007/0206258 A1 | 9/2007 | Malyak et al. |
| 2007/0228927 A1 | 10/2007 | Kindler et al. |
| 2008/0018558 A1 | 1/2008 | Kykta et al. |
| 2008/0066107 A1 | 3/2008 | Moonka et al. |
| 2008/0068295 A1 | 3/2008 | Hajjar |
| 2008/0235749 A1 | 9/2008 | Jain et al. |
| 2008/0247020 A1 | 10/2008 | Malyak et al. |

FOREIGN PATENT DOCUMENTS

| | | |
|---|---|---|
| EP | 0196862 | 10/1986 |
| EP | 0271650 | 6/1988 |
| EP | 1150361 | 10/2001 |

| | | |
|---|---|---|
| JP | 56164826 | 12/1981 |
| JP | 2-199975 | 8/1990 |
| JP | 5232583 | 9/1993 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/33970 | 4/2002 |
| WO | WO 02/057838 | 7/2002 |
| WO | WO 2005/119797 | 12/2005 |
| WO | WO 2006/097876 | 9/2006 |
| WO | WO 2006/107720 | 10/2006 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |

OTHER PUBLICATIONS

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C.-Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent $Y_2O_2S$:$Eu3+$ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N. M. et al., "LP-E: *Late News Poster*: Luminescence Study of Ion-Implanted $ZnGa_2O_4$ Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers (SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454:68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, pg. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N. Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers (SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited $CaGa_2S_4$:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).

* cited by examiner

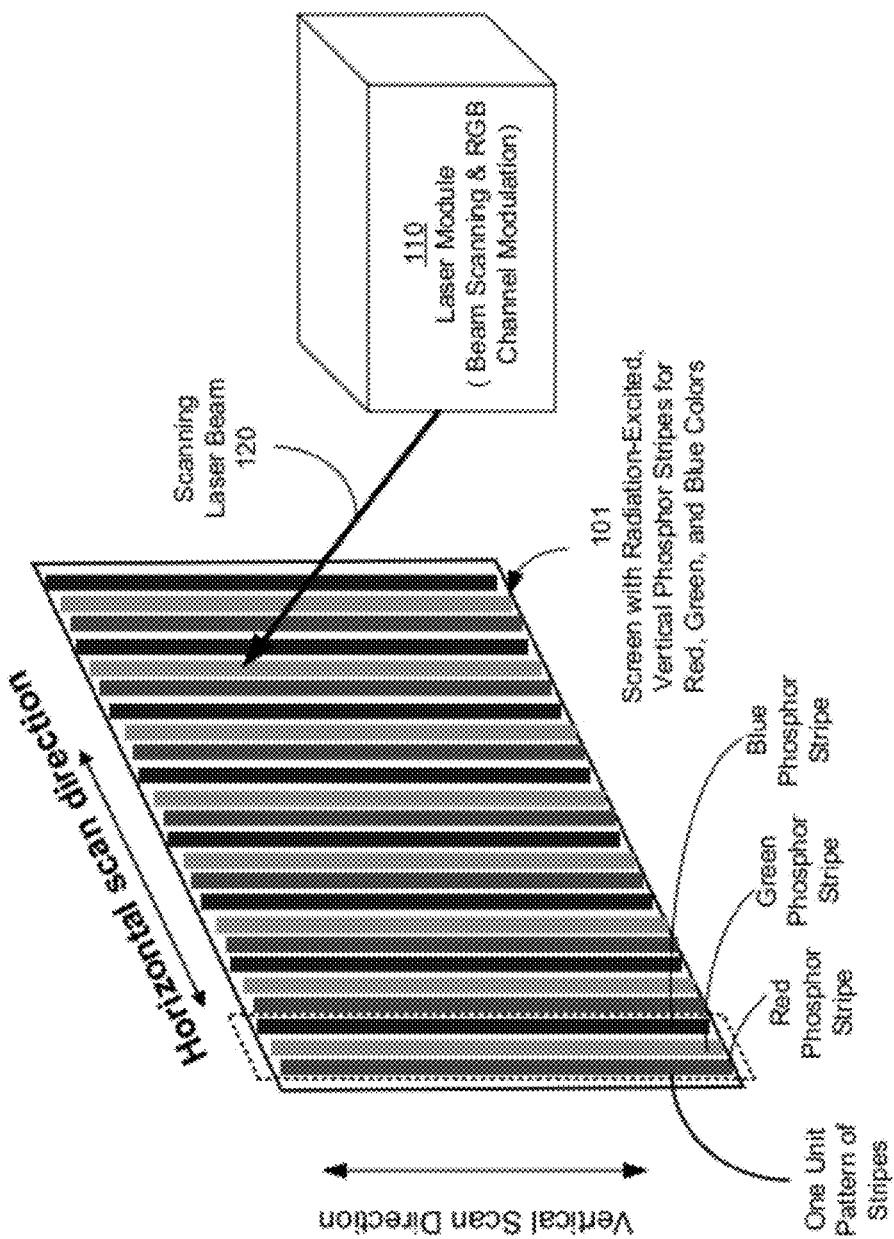

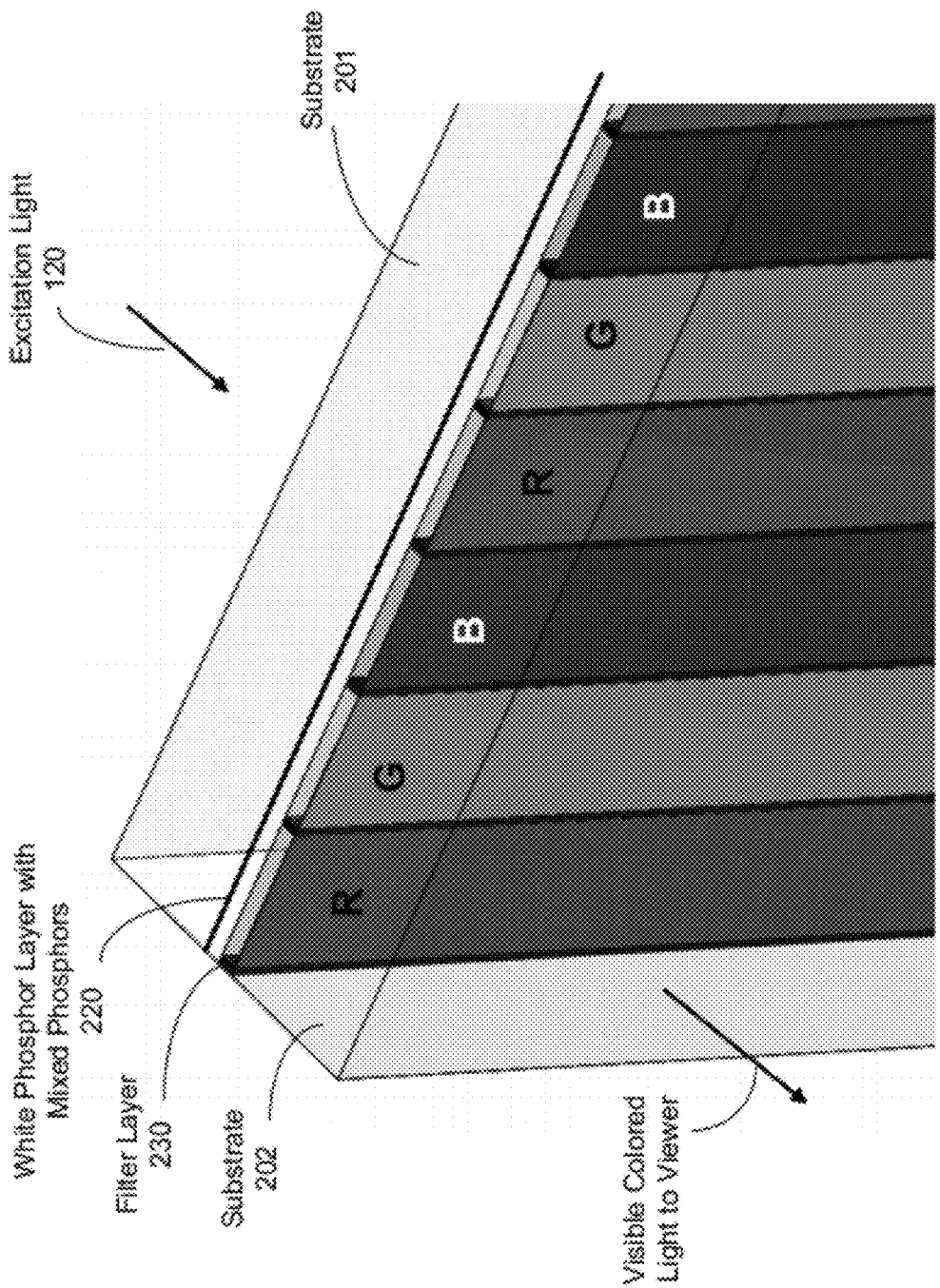

PATTERNING A SURFACE USING PRE-OBJECTIVE AND POST-OBJECTIVE RASTER SCANNING SYSTEMS

PRIORITY CLAIM AND RELATED APPLICATION

This application claims benefits of U.S. Provisional Application No. 60/910,644 entitled "POST-OBJECTIVE SCANNING BEAM SYSTEMS" and filed on Apr. 6, 2007 and U.S. Provisional Application No. 60/938,687 entitled "Patterning a surface using pre-objective and post-objective raster scanning systems" and filed on May 17, 2007. Both provisional applications are incorporated by reference as part of the specification of this application.

BACKGROUND

This application relates to scanning-beam systems for producing optical patterns in various applications, including display systems and printing systems.

Scanning beam systems can be used to project one or more scanned beams on a surface to produce optical patterns. Many laser printing systems use a scanning laser beam to print on a printing surface of a printing medium (e.g., paper). Some display systems use 2-dimensionally scanned light to produce images on a screen.

In a scanning-beam display system, an optical beam can be scanned over a screen to form images on the screen. Many display systems such as laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

Such scanning-beam display systems can be in various configurations. For example, scanning-beam display systems may use passive screens that do not emit light but make light of the scanning beam visible to a viewer by one or a combination of mechanisms, such as optical reflection, optical diffusion, optical scattering and optical diffraction. Various front and rear projection displays use passive screens. Scanning-beam display systems can also use active screens such as fluorescent screens that include fluorescent materials to emit colored light under optical excitation where the emitted light forms the images visible to viewers.

SUMMARY

The specification of this application describes, among others, scanning beam systems in both post-objective and pre-objective configurations, including display systems and printing systems. Servo control mechanisms for such display or printing systems are described.

In one aspect, a scanning beam printing system includes a printing medium holder to hold a printing medium on which images are projected and printed onto the printing medium; a laser array comprising lasers to produce laser beams having optical pulses to carry image information to be projected on the printing plate; a scanning and projection module that directs the laser beams from the laser array onto the printing medium holder and simultaneously scans the laser beams along different horizontal scan lines at the printing medium holder and to sequentially scan the laser beams in different vertical regions at the printing medium holder, wherein the scanning and projection module comprises a horizontal polygon scanner to scan the laser beams horizontally, and a vertical scanner to scan the laser beams vertically; one or more servo detectors located to receive feedback light from the printing medium holder caused by the laser beams; and a display control that controls the laser array, and the scanning and projection module in response to information in output from the one or more servo detectors.

In another aspect, a printing method includes placing an alignment plate on a printing medium holder, the alignment plate comprising optical reference marks that produce feedback light; scanning multiple laser beams each modulated to carry optical pulses to the alignment plate to simultaneously trace parallel horizontal lines in one region and to sequentially to scan parallel horizontal lines in different regions along different vertical positions on the alignment plate; detecting feedback light from the alignment plate to measure a position of each laser beam on the alignment plate; using the measured position to adjust at least one of timing of the optical pulses in each laser beam in each horizontal scan and a vertical position of each laser beam on the alignment plate; replacing the alignment plate with a printing medium on the printing medium holder; and using the scanning laser beams to print an image onto the printing medium.

In another aspect, a printing method includes placing an alignment plate on a printing medium holder, the alignment plate comprising a printing area that is optically transparent and optical reference marks that produce feedback light; placing a printing medium on the printing medium holder to overlay the alignment plate; scanning multiple laser beams each modulated to carry optical pulses to the alignment plate first and then to the printing medium to simultaneously trace parallel horizontal lines in one region and to sequentially to scan parallel horizontal lines in different regions along different vertical positions; detecting feedback light from the alignment plate to measure a position of each laser beam on the alignment plate; using the measured position to adjust at least one of timing of the optical pulses in each laser beam in each horizontal scan and a vertical position of each laser beam on the alignment plate; and using the scanning laser beams to carry an image and to print the image onto the printing medium.

In yet another aspect, various scanning systems are provided. In some implementations of scanning beam display systems, multiple lasers can be used to simultaneously scan multiple laser beams to illuminate one screen. For example, the multiple laser beams can illuminate one screen segment at a time and sequentially scan multiple screen segments to complete a full screen. The screen can include fluorescent materials which emit visible light under excitation of the scanning light to form images with the emitted visible light.

In one implementation, a scanning beam display system is described to include an optical module operable to produce a scanning beam of excitation light having optical pulses that can carry image information; a fluorescent screen which absorbs the excitation light and emits visible fluorescent light to produce images carried by the scanning beam; and an optical sensor positioned to receive a feedback optical signal from the fluorescent screen under illumination of the scanning beam and to produce a monitor signal indicating a spatial alignment of the optical pulses on the fluorescent screen. The optical module comprises a feedback control unit operable to adjust timing of the optical pulses carried by the scanning beam in response to the monitor signal to control the spatial alignment of spatial positions of the optical pulses on the fluorescent screen.

In the above scanning beam display system, the screen can include parallel fluorescent stripes which produce the images carried by the scanning beam, and servo reference marks respectively located at boundaries of the fluorescent stripes to produce the feedback optical signal under illumination of the scanning beam. The feedback optical signal varies in amplitude with a position of the scanning beam across each fluorescent stripe, and the optical module is operable to create a temporal variation in timing of the optical pulses in the scanning beam to shift positions of the optical pulses on the screen along a beam scanning direction perpendicular to the fluorescent stripes. In addition, the feedback control unit is operable to adjust timing of the optical pulses in response to information in the monitor signal to direct a position of each optical pulse towards a center of a fluorescent stripe along the beam scanning direction.

In another implementation, a method for controlling a scanning beam display system is described. In this method, a beam of excitation light modulated with optical pulses is scanned on a screen with parallel fluorescent stripes in a beam scanning direction perpendicular to the fluorescent stripes to excite the fluorescent strips to emit visible fluorescent light which forms images. A temporal variation in timing of the optical pulses in the beam of excitation light is provided to advance or delay a spatial position of each optical pulse along the beam scanning direction on the screen. A monitor signal generated from the screen under illumination by the beam of excitation light is detected and the monitor signal has an amplitude that varies with a position of the beam relative to a fluorescent stripe. The detected monitor signal is processed to obtain information on a spatial offset of a position of an optical pulse on the screen relative to a center of a fluorescent stripe and the timing of the optical pulses in the beam of excitation light is adjusted to reduce the spatial offset.

In the above method, the following operations may be conducted to control the system. A peripheral servo reference mark can be provided outside the fluorescent stripes in the beam scanning direction to produce a feedback light when illuminated by the scanning beam. The scanning beam is then controlled to scan over the peripheral servo reference mark during a scan over the fluorescent area. The scanning beam is controlled to be in a CW mode when the scanning beam is scanning over the peripheral servo reference mark and to be in a pulsed mode to carry the optical pulses when the scanning beam is scanning over the fluorescent stripes. The feedback light from the peripheral servo reference mark is used to detect a beam parameter of the scanning beam and the detected beam parameter is used to adjust the scanning beam. The peripheral servo reference mark may be used to achieve various controls, such as beam focusing, vertical beam position on the screen, and the beam power on the screen.

In yet another implementation, a scanning beam display system can include an optical module operable to produce a scanning beam of excitation light having optical pulses that can carry image information, and a fluorescent screen that includes a fluorescent area and a peripheral servo reference mark area outside the fluorescent area. The fluorescent area absorbs the excitation light and emits visible fluorescent light to produce images carried by the scanning beam. The fluorescent area includes first servo reference marks which produce a first feedback optical signal under illumination of the scanning beam. The peripheral servo reference mark area includes at least one second servo reference mark that produces a second feedback optical signal under illumination of the scanning beam. This system also includes a first optical sensor positioned to receive the first feedback optical signal and to produce a first monitor signal indicating a spatial alignment of the optical pulses on the fluorescent screen, and a second optical sensor positioned to receive the second feedback optical signal and to produce a second monitor signal indicating an optical property of the scanning beam on the fluorescent screen. The optical module includes a feedback control unit to adjust the scanning beam in response to the first and second monitor signals to control at least the spatial alignment of spatial positions of the optical pulses on the fluorescent screen.

The screen in the above system may further include a light pipe formed in the peripheral servo reference mark area of the screen. This light pipe has an input portion that is coupled to receive the second feedback optical signal generated by the second servo reference mark and an output portion that is coupled to the second optical sensor to direct the received second feedback optical signal to the second optical sensor. The second servo reference mark may be optically transmissive to direct a transmitted portion of the scanning beam to the light pipe as the second feedback optical signal.

Examples of scanning beam display systems with a first scanner and a second polygon scanner are described. In one example, such a system can include an optical module and a screen. The optical module includes a first scanner to scan along a first direction at least one scanning beam having optical pulses that are sequential in time and carry image information, and a second scanner having a polygon with reflective facets. The polygon is operable to rotate around a rotation axis that is along the first direction to scan the at least one scanning beam along a second direction perpendicular to the first direction. The screen is positioned to receive the at least one scanning beam from the optical module and configured to include (1) a display region which displays images carried by the at least one scanning beam, and (2) reference marks positioned in paths along the second direction of the least one scanning beam on the screen and displaced from one another along the first direction. Each reference mark is operable to produce an optical monitor signal when illuminated by the at least one scanning beam. The system also includes an optical detector positioned to receive the optical monitor signal from the screen and to produce a detector signal containing information on a position offset of the least one scanning beam relative to a respective reference mark on the screen, and a first scanner control that measures a pyramidal error of the polygon from the detector signal and controls scanning of the second scanner to correct the position offset caused by the pyramidal error.

A method for operating a scanning beam display system with two scanners for scanning along two directions is also described. This method includes using a first scanner to scan at least one beam of light modulated with optical pulses to carry images along a first direction on a screen and a second polygon scanner with reflective facets to scan the at least one beam along a second, perpendicular direction on the screen to display the images. Reference marks on the screen at positions that are respectively in beam scanning paths of the at least one beam by the reflective facets, respectively, are used to produce optical monitor signals when illuminated by the at least one beam during scanning. Each optical monitor signal has information on a position offset of the least one beam relative to a respective reference mark on the screen caused by a pyramidal error of a respective reflective facet in the polygon scanner. This method further includes detecting the optical monitor signals from the screen to produce a detector signal containing the information on the position offset; and adjusting the scanning of the first scanner along the first direction to reduce the position offset of the at least one beam on the screen in response to the position offset in the detector signal.

Another example of a scanning beam display system with two scanners includes an optical module operable to produce a scanning beam of excitation light having optical pulses that can carry image information, a first scanner to scan the scanning beam along a first direction, a second scanner comprising a polygon having reflective facets and operable to spin around an axis parallel to the first direction and to use the reflective facets to scan the scanning beam along a second, perpendicular direction, and a fluorescent screen comprising a fluorescent area having parallel fluorescent stripes each long the first direction and spatially displaced from one another along the second direction and a peripheral servo reference mark area outside the fluorescent area. The fluorescent stripes absorb the excitation light and emit visible fluorescent light to produce images carried by the scanning beam. The fluorescent area also includes first servo reference marks producing a first feedback optical signal under illumination of the scanning beam to indicate a spatial alignment of the optical pulses to the fluorescent stripes along the second direction. The peripheral servo reference mark area includes second servo reference marks each producing a second feedback optical signal under illumination of the scanning beam indicating a position offset of the scanning beam along the first direction. This system also includes a first optical sensor positioned to receive the first feedback optical signal and to produce a first monitor signal indicating the spatial alignment of the optical pulses relative to the fluorescent stripes, a second optical sensor positioned to receive the second feedback optical signal and to produce a second monitor signal indicating the position offset of the scanning beam along the first direction when scanned by a respective reflective facet, and a control unit operable to adjust the scanning beam in response to the first and second monitor signals to control at least the spatial alignment of spatial positions of the optical pulses relative to the fluorescent stripes and to reduce the position offset of the scanning beam along the first direction.

This application also describes an example of a scanning beam display system with two scanners that includes a polygon scanner having reflector facets and operable to rotate to scan an optical beam along a first direction, a second scanner having a reflector to cause the optical beam to scan in a second direction perpendicular to the first direction, and a control unit in communication with the second scanner to control scanning of the second scanner. The control unit is operable to dither the second scanner to cause the optical beam to change its direction back and forth along the second direction during each scanning at a dither frequency higher than a frame rate of an image carried by the optical beam.

In addition, this application describes an example of a method for displaying images with two scanners that uses a polygon scanner having reflector facets to scan an optical beam along a first direction and uses a second scanner having a reflector to scan the optical beam in a second direction perpendicular to the first direction. This method includes controlling the scanning of the optical beam to scan the optical beam with different facets of the polygon scanner at each horizontal scanning line in successive frames.

Various servo control techniques based on feedback light from the screen are described for scanning display systems with fluorescent screens. Light from a fluorescent screen is detected to monitor an error in timing of optical pulses in a scanning beam of excitation light on the screen. Such light can be, for example, reflected or scattered light of the excitation light, or fluorescent light emitted by the screen under illumination of the excitation light. Examples of both static servo control and dynamic servo control are described. The static servo control is performed during the power-on stage of the system when the screen does not display images and the dynamic servo control is performed during the normal operation of the system when images are displayed on the screen.

These and other examples and implementations are described in detail in the drawings, the detailed description and the claims.

BRIEF DESCRIPTION OF THE DRAWINGS

FIG. 1 shows an example scanning laser display system having a fluorescent screen made of laser-excitable fluorescent materials (e.g., phosphors) emitting colored lights under excitation of a scanning laser beam that carries the image information to be displayed.

FIG. 2C shows another example for a fluorescent screen with fluorescent stripes formed by placing parallel optical filters over the layer of a uniform fluorescent layer which emits white light under optical excitation.

DETAILED DESCRIPTION

Figure 2A:
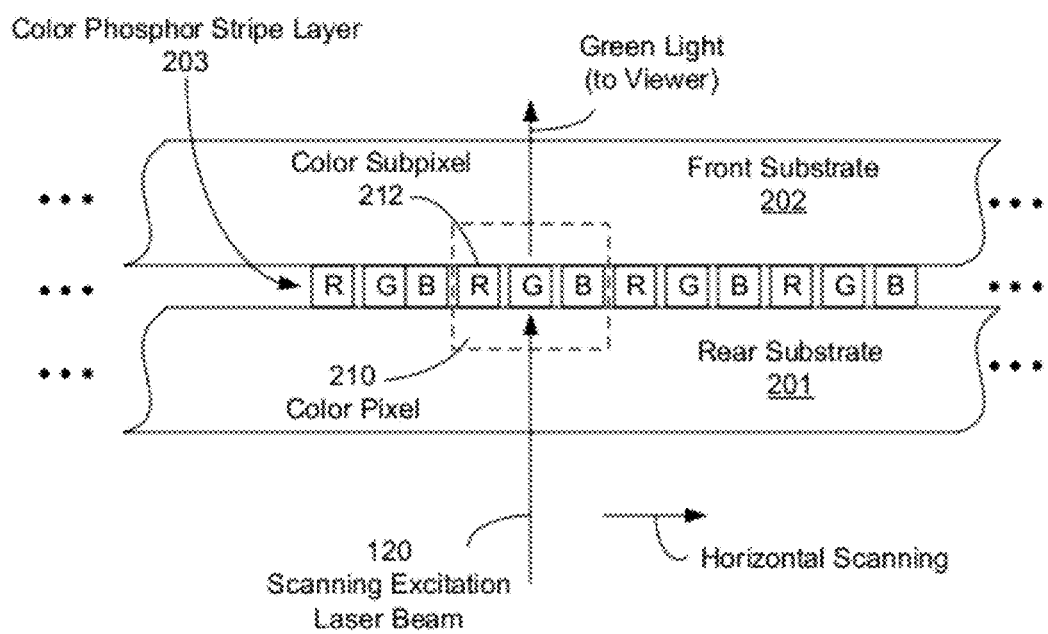
FIGS. 2A and 2B show one example screen structure with parallel fluorescent stripes and the structure of color pixels on the screen in FIG. 1.

The following sections first describe examples of scanning beam display systems and devices that use fluorescent screens with fluorescent materials to emit light under optical excitation to produce images. Various examples of implementations of scanning beam display systems are described in U.S. patent application Ser. No. 11/515,420 entitled "Display Systems Having Screens With Optical Fluorescent Materials" filed on Jan. 18, 2006 (US patent publication no. US 2006-0221021 A1) and PCT Application No. PCT/US2006/11757 entitled "Display Systems and Devices Having Screens With Optical Fluorescent Materials" and filed on Mar. 31, 2006 (PCT publication No. 2006/107720), both of which are incorporated by reference as part of the specification of this application.

Scanning-beam display systems using fluorescent screens can include laser vector scanner display devices and laser video display devices that use laser excitable fluorescent screens to produce images by absorbing excitation laser light and emitting colored light. Various examples of screen designs with fluorescent materials are described. Screens with phosphor materials under excitation of one or more scanning excitation laser beams are described in detail and are used as specific implementation examples of optically excited fluorescent materials in various system and device examples in this application. In one implementation, for example, three different color phosphors that are optically excitable by the laser beam to respectively produce light in red, green, and blue colors suitable for forming color images can be formed on the screen as repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials.

For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Some implementations of laser-based display techniques and systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear scanner systems where the viewer and the laser module 110 are on the opposite sides of the screen 101. Alternatively, such display systems may be configured as front scanner systems where the viewer and laser module 110 are on the same side of the screen 101.

FIG. 2A shows an exemplary design of the screen 101 in FIG. 1. The screen 101 in this particular example includes a rear substrate 201 which is transparent to the scanning laser beam 120 and faces the laser module 110 to receive the scanning laser beam 120. A second front substrate 202 is fixed relative to the rear substrate 201 and faces the viewer so that the fluorescent light transmits through the substrate 202 towards the viewer. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
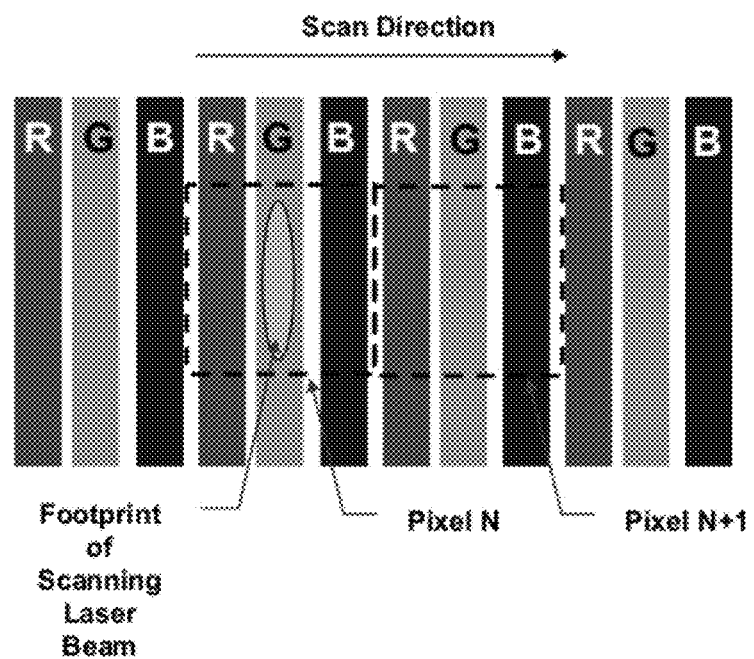

In FIG. 2A, the scanning laser beam 120 is directed at the green phosphor stripe within a pixel to produce green light for that pixel. FIG. 2B further shows the operation of the screen 101 in a view along the direction perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Alternatively, FIG. 2C illustrates an example of a fluorescent screen design that has a contiguous and uniform layer 220 of mixed phosphors. This mixed phosphor layer 220 is designed and constructed to emit white light under optical excitation of the excitation light 120. The mixed phosphors in the mixed phosphor layer 220 can be designed in various ways and a number of compositions for the mixed phosphors that emit white light are known and documented. Notably, a layer 210 of color filters, such as stripes of red-transmitting, green-transmitting and blue-transmitting filters, is placed on the viewer side of the mixed phosphor layer 220 to filter the white light and to produce colored output light. The layers 210 and 220 can be sandwiched between substrates 201 and 202. The color filters may be implemented in various configurations, including in designs similar to the color filters used in color LCD panels. In each color filter region e.g., a red-transmitting filter, the filter transmits the red light and absorbs light of other colors including green light and blue light. Each filter in the layer 210 may be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films," for example, describe red, green and blue filters that may be used in the screen design in FIG. 2C. Hence, a fluorescent stripe in the fluorescent screen 101 in various examples described in this application is a fluorescent stripe that emits a designated color under optical excitation and can be either a fluorescent stripe formed of a particular fluorescent material that emits the designed color in FIG. 2A or a combination of a stripe color filter and a white fluorescent layer in FIG. 2C.

Figure 3:
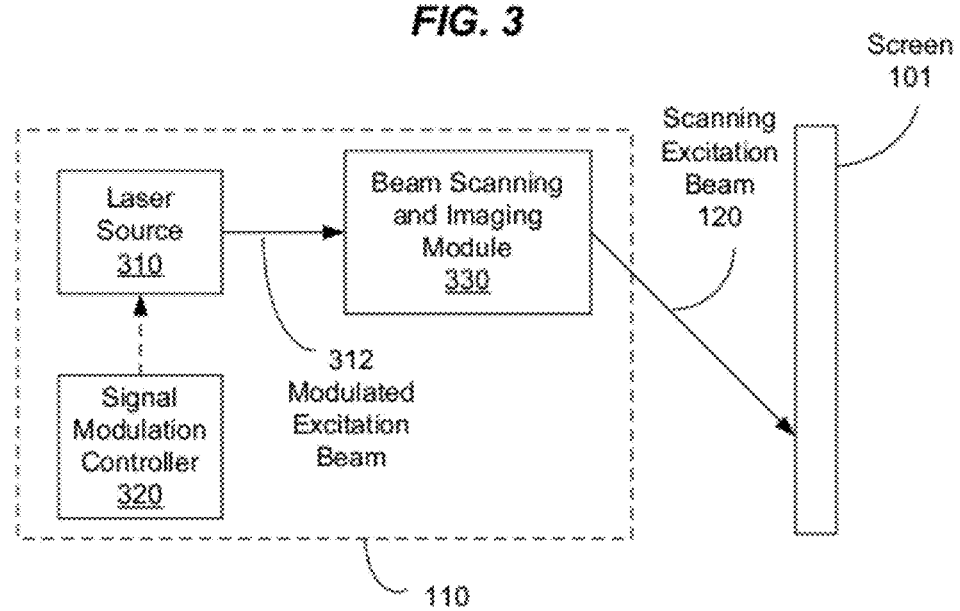
FIGS. 3 and 4 show two different scanning beam displays.

The optical modulation in the laser module 110 in FIG. 1 can be implemented in two different configurations. FIG. 3 shows an implementation of the display in FIG. 1 where a laser source 310 such as a diode laser is directly modulated to produce a modulated excitation beam 312 that carries the image signals in red, green and blue. The laser module 110 in this implementation includes a signal modulation controller 320 which modulates the laser source 310 directly. For example, the signal modulation controller 320 can control the driving current of a laser diode as the laser source 310. A beam scanning and imaging module 330 then scans and projects the modulated excitation beam 312 as the scanning excitation beam 120 to the screen 101 to excite the color phosphors.

Figure 4:
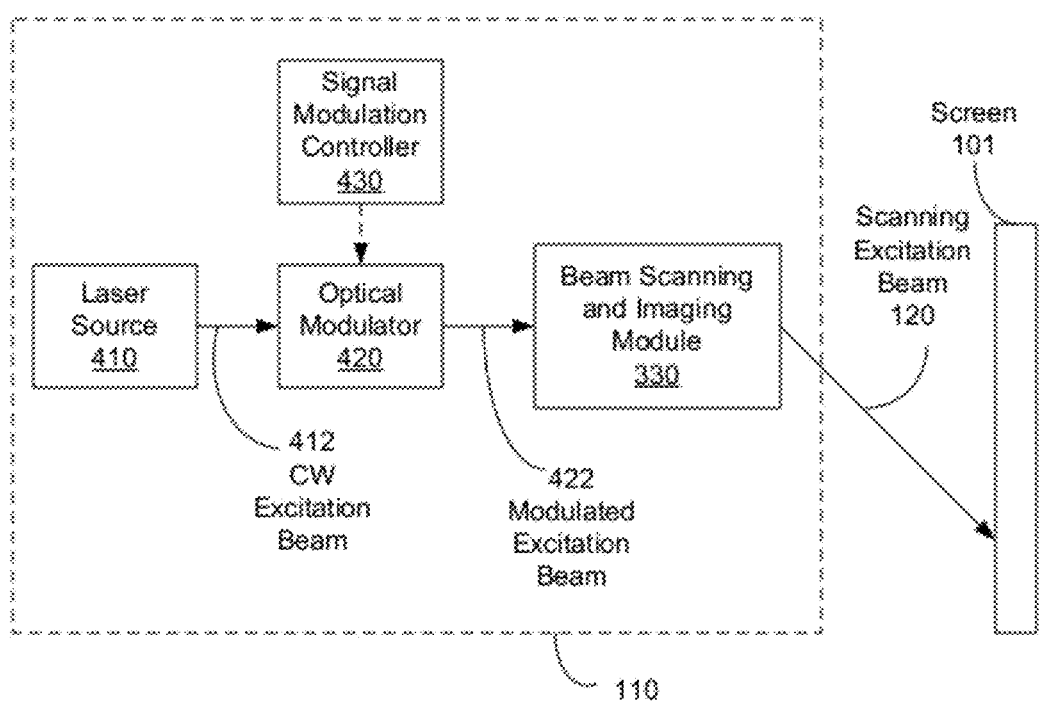

Alternatively, FIG. 4 shows another implementation of the display in FIG. 1 where a laser source 410 is used to generate a CW unmodulated excitation laser beam 412 and an optical modulator 420 is used to modulate the CW excitation laser beam 412 with the image signals in red, green and blue and to produce a modulated excitation beam 422. A signal modulation controller 430 is used to control the optical modulator 420. For example, an acousto-optic modulator or an electro-optic modulator may be used as the optical modulator 420. The modulated beam 422 from the optical modulator 420 is then scanned and projected onto the screen 101 by the beam scanning and imaging module 330 as the scanning excitation beam 120.

Figure 5:
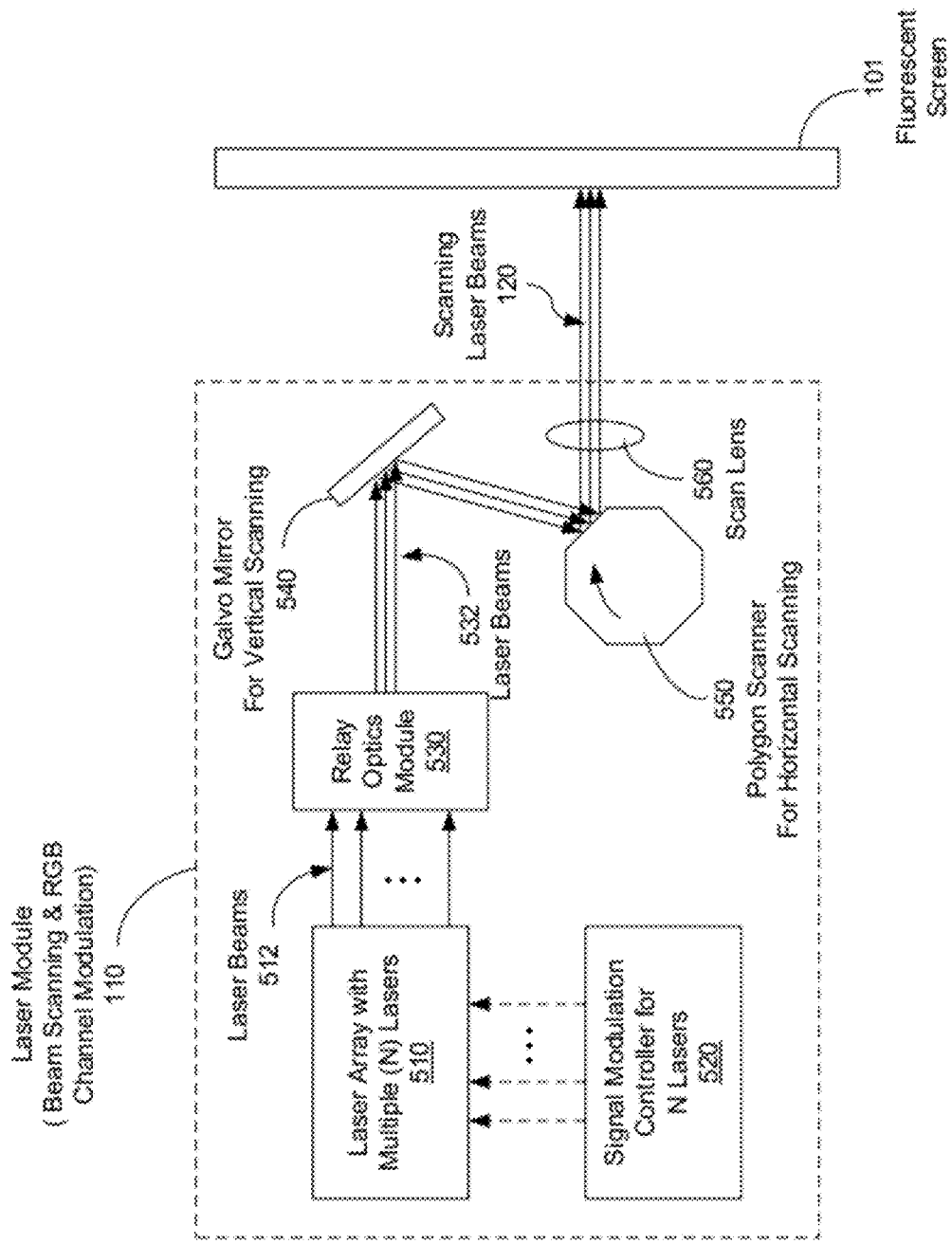
FIG. 5 shows an example implementation of the laser module in FIG. 3 having multiple lasers that direct multiple laser beams on the screen.

FIG. 5 shows an example implementation of the laser module 110 in FIG. 1. A laser array 510 with multiple lasers is used to generate multiple laser beams 512 to simultaneously scan the screen 101 for enhanced display brightness. The laser array 510 can be implemented in various configurations, such as discrete laser diodes on separate chips arranged in an array and a monolithic laser array chip having integrated laser diodes arranged in an array. A signal modulation controller 520 is provided to control and modulate the lasers in the laser array 510 so that the laser beams 512 are modulated to carry the image to be displayed on the screen 101. The signal modulation controller 520 can include a digital image processor which generate the digital image signals for the three different color channels and laser driver circuits that produce laser control signals carrying the digital image signals. The laser control signals are then applied to modulate the lasers in the laser array 510, e.g., the currents for laser diodes.

The beam scanning is achieved by using a scanning mirror 540 such as a galvo mirror for the vertical scanning and a multi-facet polygon scanner 550 for the horizontal scanning. A scan lens 560 is used to project the scanning beams form the polygon scanner 550 onto the screen 101. The scan lens 560 is designed to image each laser in the laser array 510 onto the screen 101. Each of the different reflective facets of the polygon scanner 550 simultaneously scans N horizontal lines where N is the number of lasers. In the illustrated example, the laser beams are first directed to the galvo mirror 540 and then from the galvo mirror 540 to the polygon scanner 550. The output scanning beams 120 are then projected onto the screen 101. A relay optics module 530 is placed in the optical path of the laser beams 512 to modify the spatial property of the laser beams 512 and to produce a closely packed bundle of beams 532 for scanning by the galvo mirror 540 and the polygon scanner 550 as the scanning beams 520 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 520. The beam scanning thus maps the timely coded image signals in the beams 120 onto the spatial pixels on the screen 101.

Figure 6:
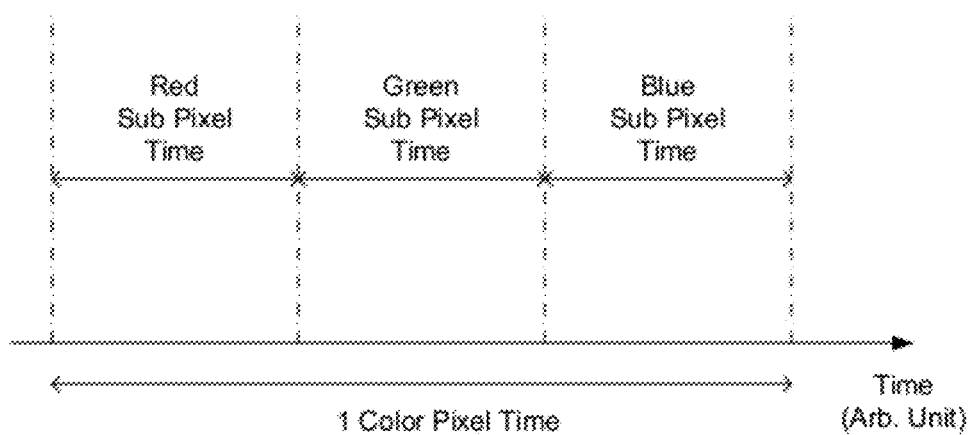
FIG. 6 shows one example for time division on each modulated laser beam 120 where each color pixel time is equally divided into three sequential time slots for the three color channels.

For example, FIG. 6 shows one example for time division on each modulated laser beam 120 where each color pixel time is equally divided into three sequential time slots for the three color channels. The modulation of the beam 120 may use pulse modulation techniques, such as pulse width modulation, pulse amplitude modulation or a combination of pulse width modulation and pulse amplitude modulation, to produce desired grey scales in each color, proper color combination in each pixel, and desired image brightness.

The beams 120 on the screen 101 are located at different and adjacent vertical positions with two adjacent beams being spaced from each other on the screen 101 by one horizontal line of the screen 101 along the vertical direction. For a given position of the galvo mirror 540 and a given position of the polygon scanner 550, the beams 120 may not be aligned with each other along the vertical direction on the screen 101 and may be at different positions on the screen 101 along the horizontal direction. The beams 120 can cover one portion of the screen 101. At a fixed angular position of the galvo mirror 540, the spinning of the polygon scanner 550 causes the beams 120 from N lasers in the laser array 510 to scan one screen segment of N adjacent horizontal lines on the screen 101. At the end of each horizontal scan, the galvo mirror 540 is adjusted to a different fixed angular position so that the vertical positions of all N beams 120 are adjusted to scan the next adjacent screen segment of N horizontal lines. This process iterates until the entire screen 101 is scanned to produce a full screen display.

Figure 7:
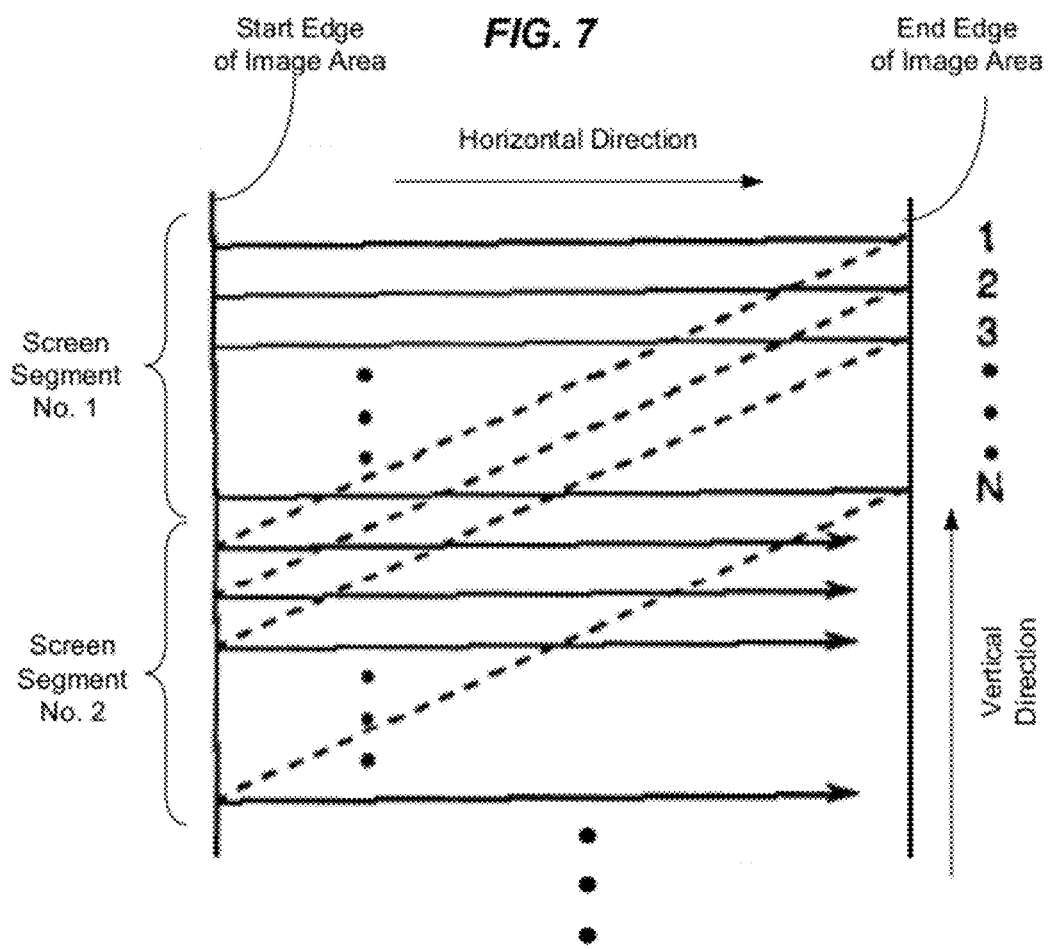
FIG. 7 shows one example for simultaneously scanning consecutive scan lines with multiple excitation laser beams.

FIG. 7 illustrates the above simultaneous scanning of one screen segment with multiple scanning laser beams 120 at a time. Visually, the beams 120 behaves like a paint brush to "paint" one thick horizontal stroke across the screen 101 at a time to cover one screen segment between the start edge and the end edge of the image area of the screen 101 and then subsequently to "paint" another thick horizontal stroke to cover an adjacent vertically shifted screen segment. Assuming the laser array 310 has 36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam 120 scans only a number of lines across the entire screen along the vertical direction that is equal to the number of screen segments. Hence, the polygon scanner 550 for the horizontal scanning can operate at slower speeds than scanning speeds required for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror and the polygon scanner scan 30 lines per frame while a total of 108 lines per frame are scanned when there are only 10 lasers. Therefore, the use of the multiple lasers can increase the image brightness which is approximately proportional to the number of lasers used, and, at the same time, can also advantageously reduce the response speeds of the scanning system.

A scanning display system described in this specification can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red flag in the intended image may be displayed as a green flag on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

Implementations of various alignment mechanisms are provided in this specification to maintain proper alignment of the scanning beam 120 on the desired sub-pixel to achieved desired image quality. These alignment mechanisms include reference marks on the screen, both in the fluorescent area and in one or more peripheral area outside the fluorescent area, to provide feedback light that is caused by the excitation beam 120 and represents the position and other properties of the scanning beam on the screen. The feedback light can be measured by using one or more optical servo sensors to produce a feedback servo signal. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer.

The following sections first describe examples of screen detection techniques and servo feedback implementations.

Two optical detection methods can be used to detect the location of a beam relative to a target feature on the screen, which may be a subpixel or a selected position on the screen such as the beginning edge of the fluorescent area. In the first optical detection method, the light impinging on a servo reference mark for the target feature can be guided as the feedback light through air or other medium to reach one or more respective optical servo sensing detectors which convert the optical light levels of the feedback light into electrical amplitude signals. The second optical detection method uses one or more optical servo sensing detectors placed in air to collect diffused light from a servo reference mark on the screen as the feedback light for the servo control. In detecting diffused light, an optical servo sensing detector can be placed behind a collection lens such as a hemispherical lens. Radiation detectors can be used to detect feedback light from diffusive type targets, e.g., targets that allow the light to diffuse in a wide angular spectrum. An example of a diffuse target is a rough surface such as a surface with a white paint. Both techniques can be used with reflective or transmissive servo reference marks.

Figure 8:
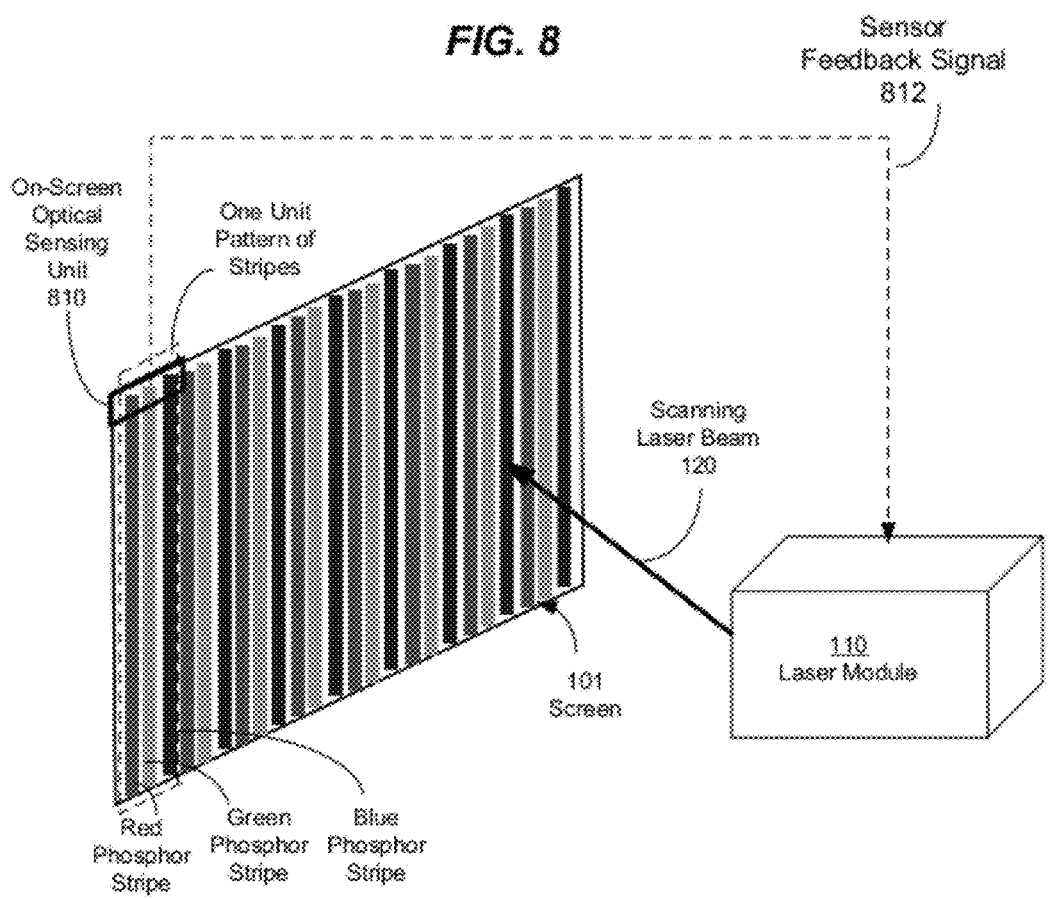
FIG. 8 shows one example of a scanning display system using a servo feedback control and an on-screen optical sensing unit.

FIG. 8 shows an exemplary scanning beam display system with an on-screen optical sensing unit and a feedback control to allow the laser module 110 to correct the horizontal misalignment. The screen 101 includes an on-screen optical sensing unit 810 for optically measuring the responses of color subpixels on the screen 101 to produce a sensor feedback signal 812. The laser module 110 has a feedback control to allow the laser module 110 to correct the misalignment in response to the feedback signal 812 from the screen 101.

Figure 9:
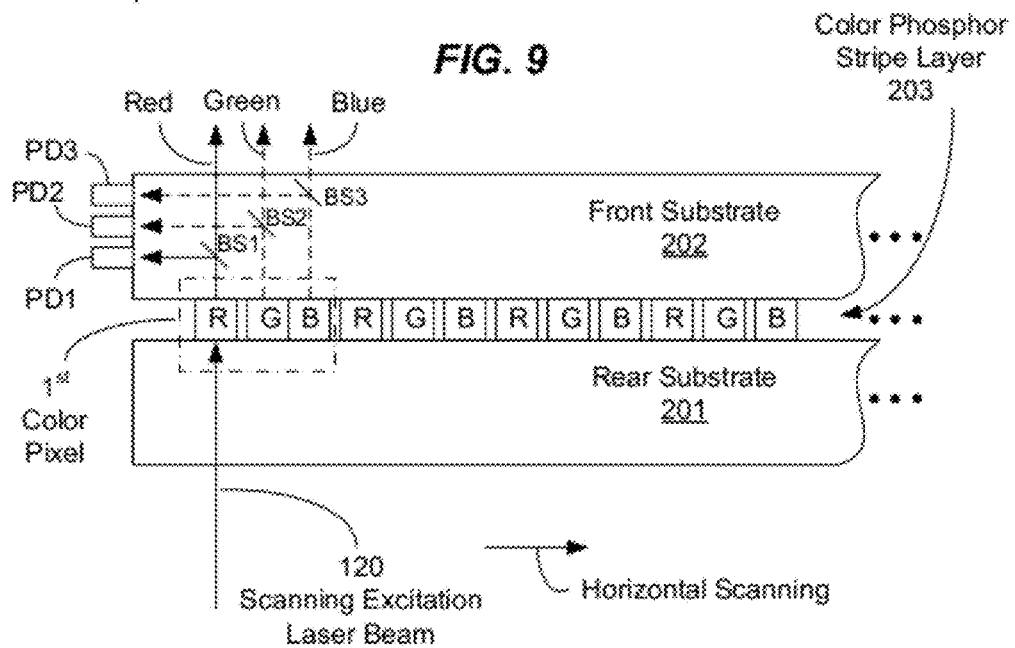
FIG. 9 shows one example of a fluorescent screen with on-screen optical servo detectors.

FIG. 9 shows one example of the on-screen optical sensing unit 810 which includes three optical "direct" detectors PD1, PD2 and PD3 that are respectively configured to respond to red, green and blue light. In this specific example, three beam splitters BS1, BS2 and BS3 are placed behind red, green and blue subpixels of a color pixel, respectively and are used to split small fractions of red, green, and blue light beams emitted from the color sub pixels of the color pixel to the three detectors PD1, PD2 and PD3 formed on the front substrate of the screen 101. Alternatively, the above red, green and blue optical detectors PD1, PD2 and PD3 may also be positioned on the screen 101 to allow each detector to receive light from multiple pixels on the screen 101. Each optical detector is only responsive to its designated color to produce a corresponding detector output and does not produce a detector output when receiving light of other colors. Hence, the red optical detector PD1 detects only the red light and is not responsive to green and blue light; the green optical detector PD 2 detects only green light and is not responsive to red and blue light; and the blue optical detector PD3 detects only the blue light and is not responsive to red and green light. This color selective response of the one-screen optical sensing unit 810 may be achieved by, e.g., using red, green and blue optical bandpass filters in front of the optical detectors PD1, PD2 and PD3, respectively, when each detector is exposed to light of different colors from the screen 101, or placing the optical detectors PD1, PD2 and PD3 in a way that only light of a designated color can enter a respective optical detector for the designated color. Assume the adjacent color phosphor stripes are arranged in the order of red, green and blue from the left to the right in the horizontal direction of the screen 101. Consider a situation where a red image is generated by the display processor in the laser module 110. When the horizontal alignment is out of order or misaligned by one sub pixel, the red detector does not respond while either the blue detector or the green detector produces an output. Such detector outputs can be processed by the feedback control in the laser module 110 to detect the horizontal misalignment and, accordingly, can adjust the timing of the optical pulses in the scanning beam to correct misalignment.

Alternative to the beam splitter in FIG. 9 a light guide or light pipe can be used. Light guides are structures that guide a portion of the light to an optical servo sensing detector. A light guide can be formed on the screen to direct feedback light via total internal reflection (TIR) in the light guide to the detector.

Figure 10:
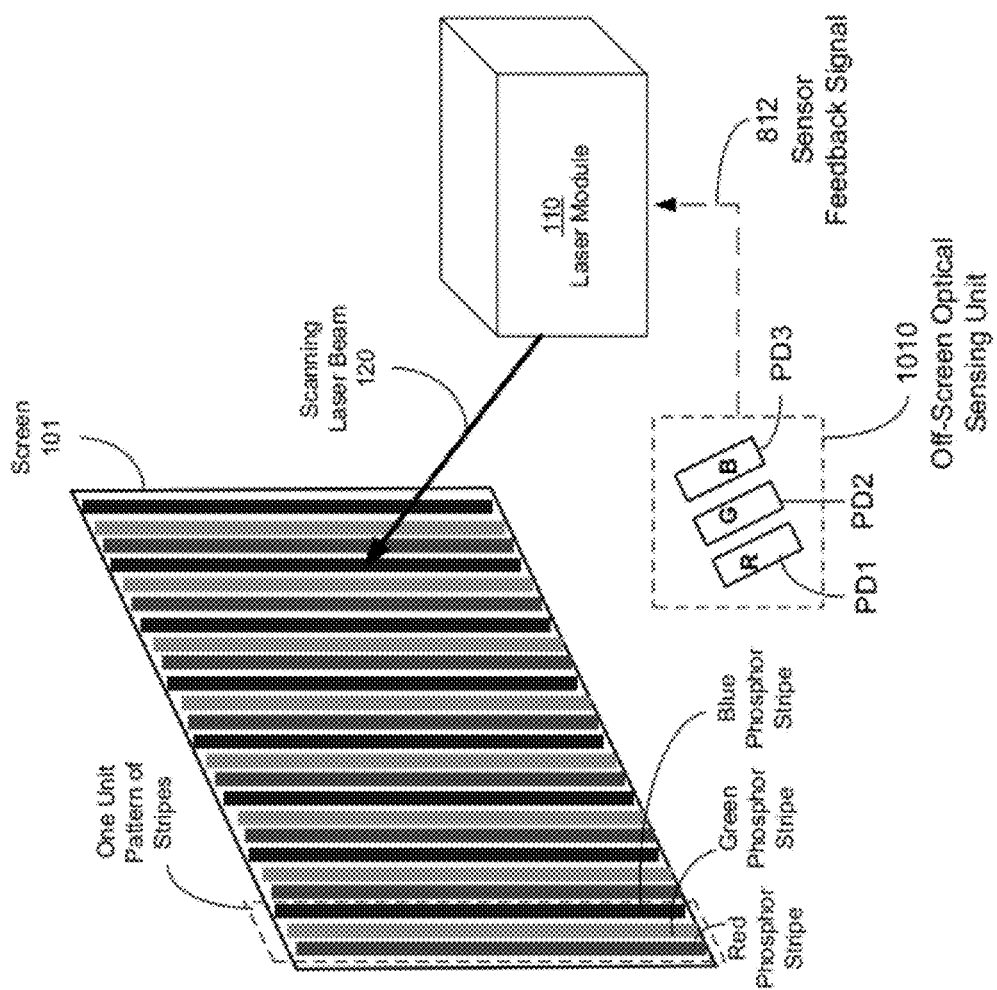
FIG. 10 shows one example of a scanning display system using a servo feedback control and an off-screen optical sensing unit.

FIG. 10 shows another scanning beam display system with a servo feedback control using a radiation style detector. In this system, an off-screen optical sensing unit 1010 is used to detect the red, green and blue light emitted from the screen. Three optical detectors PD1, PD2 and PD3 are provided in the sensing unit 1010 to detect the red, green and blue fluorescent light, respectively. Each optical detector is designed to receive light from a part of or the entire screen. A bandpass optical filter can be placed in front of each optical detector to select a designated color while rejecting light of other colors.

For the screen 101, additional alignment reference marks can be used to determine the relative position of the beam and the screen and other parameters of the excitation beam on the screen. For example, during a horizontal scan of the excitation beam 120 across the fluorescent stripes, a start of line mark can be provided for the system to determine the beginning of the active fluorescent display area of the screen 101 so that the signal modulation controller of the system can begin deliver optical pulses to the targeted pixels. An end of line mark can also be provided for the system to determine the end of the active fluorescent display area of the screen 101 during a horizontal scan. For another example, a vertical alignment referenced mark can be provided for the system to determine whether the beam 120 is pointed to a proper vertical location on the screen. Other examples for reference marks may be one or more reference marks for measuring the beam spot size on the screen and one or more reference marks on the screen to measure the optical power of the excitation beam 120. Such reference marks can be placed a region outside the active fluorescent area of the screen 101, e.g., in one or more peripheral regions of the active fluorescent screen area.

Figure 11:
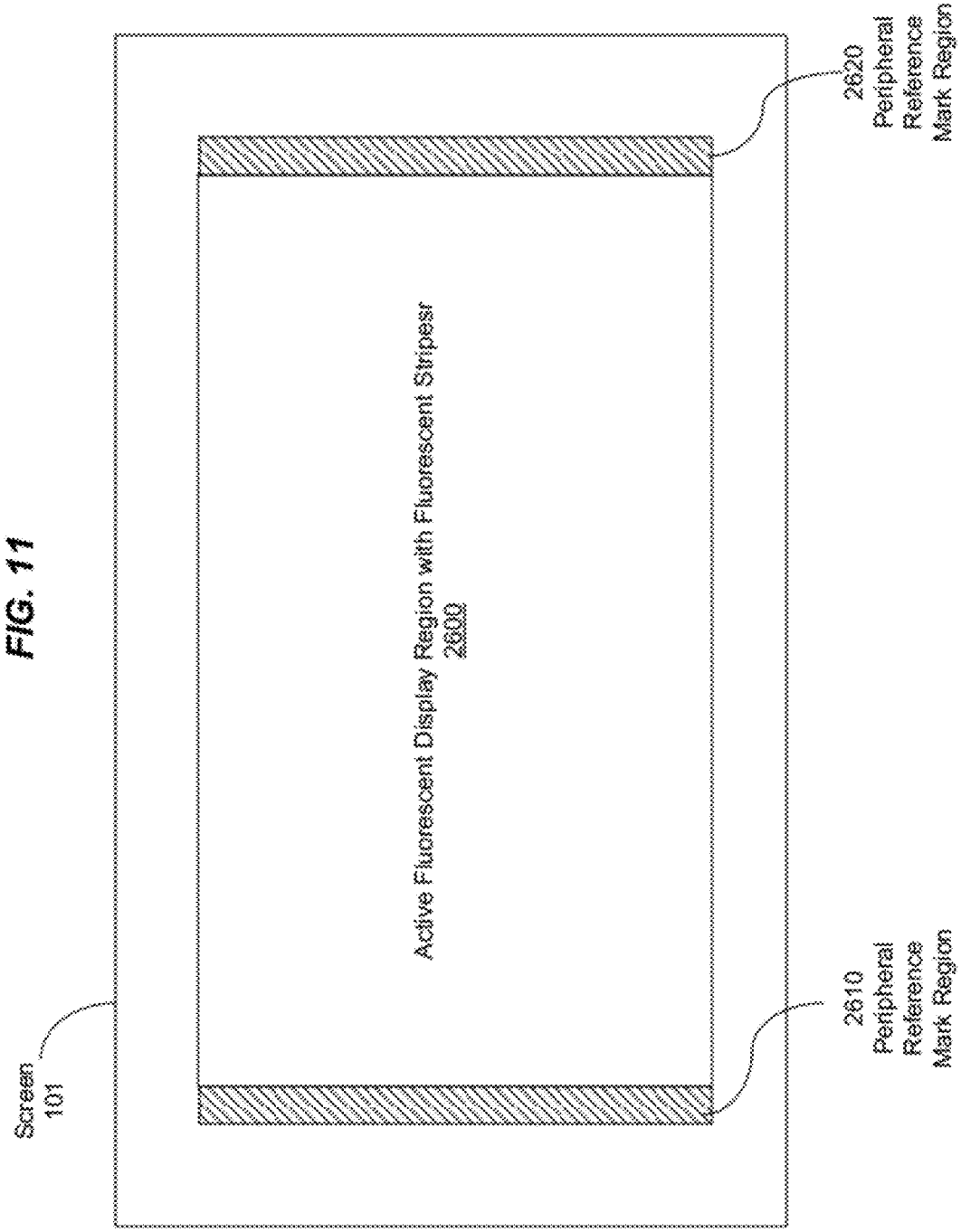
FIG. 11 shows an example of a fluorescent screen having peripheral reference mark regions that include servo reference marks that produce feedback light for various servo control functions.

FIG. 11 illustrates one example of a fluorescent screen 101 having peripheral reference mark regions. The screen 101 includes a central active fluorescent area 2600 with parallel fluorescent stripes for displaying images, two stripe peripheral reference mark regions 2610 and 2620 that are parallel to the fluorescent stripes. Each peripheral reference mark region can be used to provide various reference marks for the screen 101. In some implementations, only the left peripheral reference mark region 2610 is provided without the second region 2620 when the horizontal scan across the fluorescent stripes is directed from the left to the right of the area 2600.

Such a peripheral reference mark region on the screen 101 allows the scanning display system to monitor certain operating parameters of the system. Notably, because a reference mark in the peripheral reference mark region is outside the active fluorescent display area 2600 of the screen 101, a corresponding servo feedback control function can be performed outside the duration during the display operation when the excitation beam is scanning through the active fluorescent display area 2600 to display image. Therefore, a dynamic servo operation can be implemented without interfering the display of the images to the viewer. In this regard, each scan can include a CW mode period when an excitation beam sans through the peripheral referenced mark region for the dynamic servo sensing and control and a display mode period when the modulation of the excitation beam is turned on to produce image-carrying optical pulses as the excitation beam sans through the active fluorescent display area 2600.

Figure 12:
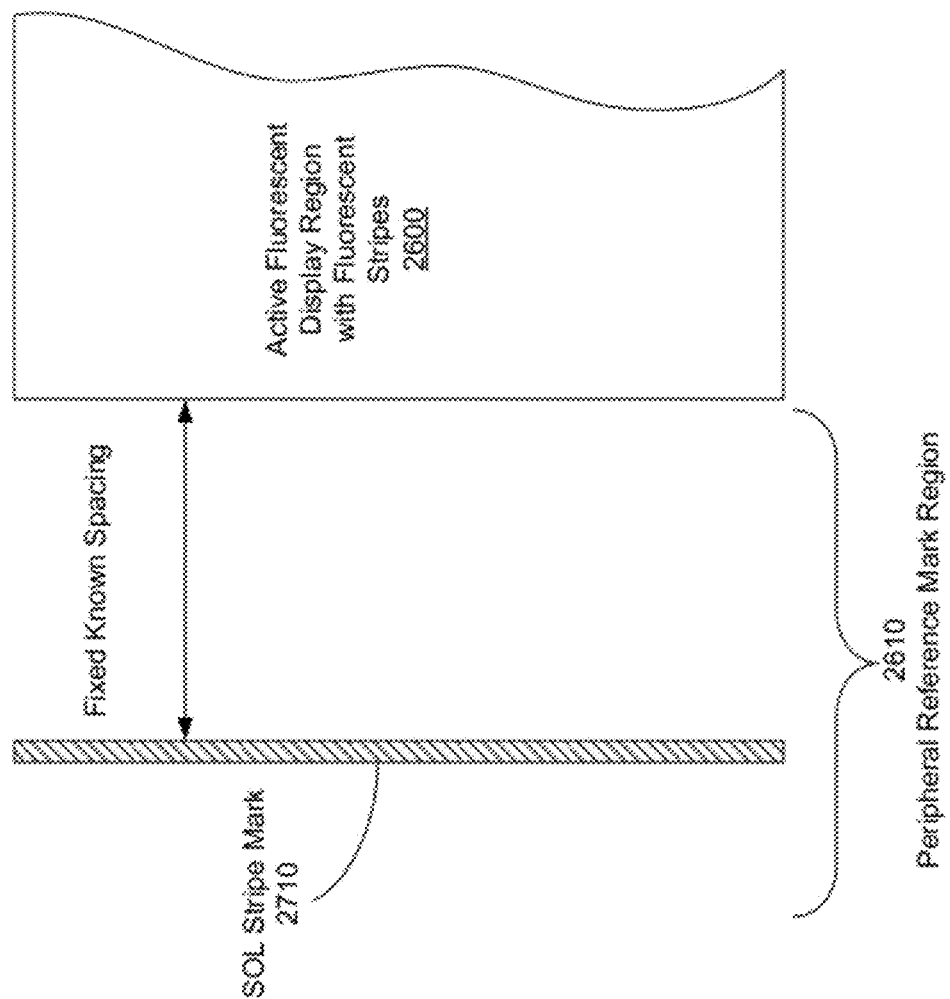
FIG. 12 shows a start of line reference mark in a peripheral reference mark region to provide a reference for the beginning of the active fluorescent area on the screen.

FIG. 12 shows an example of a start of line (SOL) reference mark 2710 in the left peripheral region 2610 in the screen 101. The SOL reference mark 2710 can be an optically reflective, diffusive or fluorescent stripe parallel to the fluorescent stripes in the active fluorescent region 2600 of the screen 101. The SOL reference mark 2710 is fixed at a position with a known distance from the first fluorescent stripe in the region 2600. SOL patterns may include multiple vertical lines with uniform or variable spacing. Multiple lines are selected for redundancy, increasing signal to noise, accuracy of position (time) measurement, and providing missing pulse detection.

In operation, the scanning excitation beam 120 is scanned from the left to the right in the screen 101 by first scanning through the peripheral reference mark region 2610 and then through the active fluorescent region 2600. When the beam 120 is in the peripheral reference mark region 2610, the signal modulation controller in the laser module 110 of the system sets the beam 120 in a CW mode without the modulated optical pulses that carry the image data. When the scanning excitation beam 120 scans through the SOL reference mark 2710, the light reflected, scattered or emitted by the SOL reference mark 2710 due to the illumination by the excitation beam 2710 can be measured at an SOL optical detector located near the SOL reference mark 2710. The presence of this signal indicates the location of the beam 120. The SOL optical detector can be fixed at a location in the region 2610 on the screen 101 or off the screen 101. Therefore, the SOL reference mark 2710 can be used to allow for periodic alignment adjustment during the lifetime of the system.

The laser beam is turned on continuously as a CW beam before the beam reaches the SOL mark 2710 in a scan. When the pulse from the SOL detected is detected, the laser can be controlled to operate in the image mode and carry optical pulses with imaging data. The system then recalls a previously measured value for the delay from SOL pulse to beginning of the image area. This process can be implemented in each horizontal scan to ensure that each line starts the image area properly aligned to the color stripes. The correction is made prior to painting the image for that line, so there is no lag in correction allowing for both high frequency (up to line scan rate) and low frequency errors to be corrected.

Physical implementation of the SOL sensor may be a reflective (specular or diffuse) pattern with an area detector(s), an aperture mask with light pipe to collect the transmitted light into a single detector or multiple detectors.

With reflective method, multiple lasers on and passing over reflective areas simultaneously may create self interference. A method to prevent this is to space the laser beams such that only one active beam passes over the reflective area at a time. It is likely that some reflection will come from the image area of the screen. To prevent this from interfering with the SOL sensor signal, the active laser beams may be spaced such that no other laser beams are active over any reflective area when the desired active laser beam is passing over the reflective SOL sensor area. The transmission method is not affected by reflections from the image area.

Similar to the SOL mark 2710, an end-of-line (EOL) reference mark can be implemented on the opposite side of the screen 101, e.g., in the peripheral reference mark region 2620 in FIG. 11. The SOL mark is used to ensure the proper alignment of the laser beam with the beginning of the image area. This does not ensure the proper alignment during the entire horizontal scan because the position errors can be present across the screen. Implementing the EOL reference mark and an end-of-line optical detector in the region 2620 can be used to provide a linear, two point correction of laser beam position across the image area.

When both SOL and EOL marks are implemented, the laser is turned on continuously in a continuous wave (CW) mode prior to reaching the EOL sensor area. Once the EOL signal is detected, the laser can be returned to image mode and timing (or scan speed) correction calculations are made based on the time difference between the SOL and EOL pulses. These corrections are applied to the next one or more lines. Multiple lines of SOL to EOL time measurements can be averaged to reduce noise.

In addition to control of the horizontal beam position along the scan direction perpendicular to the fluorescent stripes, the beam position along the vertical position parallel to the fluorescent stripes can also be monitored and controlled to ensure the image quality. Referring to FIG. 2B, each fluorescent stripe may not have any physical boundaries between two pixels along the vertical direction. This is different from the pixilation along the horizontal scan direction perpendicular to the fluorescent stripes. The pixel positions along the fluorescent stripes are controlled by the vertical beam position on the screen to ensure a constant and uniform vertical pixel positions without overlapping and gap between two different horizontal scan lines. Referring to the multi-beam scanning configuration in FIG. 7, when multiple excitation beams are used to simultaneously scan consecutive horizontal scan within one screen segment on the screen, the proper vertical alignment of the lasers to one another are important to ensure a uniform vertical spacing between two adjacent laser beams on the screen and to ensure a proper vertical alignment between two adjacent screen segments along the vertical direction. In addition, the vertical positioning information on the screen can be used to provide feedback to control the vertical scanner amplitude and measure the linearity of the vertical scanner.

Vertical position of each laser can be adjusted by using an actuator, a vertical scanner such as the galvo mirror 540 in FIG. 5, an adjustable lens in the optical path of each laser beam or a combination of these and other mechanisms. Vertical reference marks can be provided on the screen to allow for a vertical servo feedback from the screen to the laser module. One or more reflective, fluorescent or transmissive vertical reference marks can be provided adjacent to the image area of the screen 101 to measure the vertical position of each excitation beam 120. Referring to FIG. 11, such vertical reference marks can be placed in a peripheral reference mark region. One or more vertical mark optical detectors can be used to measure the reflected, fluorescent or transmitted light from a vertical reference mark when illuminated by the excitation beam 120. The output of each vertical mark optical detector is processed and the information on the beam vertical position is used to control an actuator to adjust the vertical beam position on the screen 101.

In implementing multiple lasers for simultaneously scanning consecutive lines within one of multiple screen segments as shown in FIG. 7, two separate vertical positioning servo control mechanisms can be implemented. The first vertical positioning servo control is to control the line to line spacing of different horizontal lines scanned by different lasers at the same time within each screen segment. Accordingly, at each line, a vertical reference mark and an associated optical detector are needed to provide servo feedback to control the vertical beam position of each laser beam. Hence, this first vertical servo control mechanism includes N vertical servo feedback controls for the N lasers, respectively.

The second vertical positioning servo control is to control the vertical alignment between two adjacent screen segments by using the galvo mirror 540 in FIG. 5 to vertically move all N laser beams, after completion of scanning one screen segment, to an adjacent screen segment. This can be achieved by controlling the galvo mirror 540 to make a common adjustment in the vertical direction for all N laser beams. The vertical reference mark in the peripheral reference mark region 2610 in FIG. 11 and the associated optical detector for the top line in each screen segment can be used to measure the vertical position of the first of the N laser beams when the beams are still scanning through the peripheral reference mark region 2610 in FIG. 11. This vertical information obtained in this measurement is used as a feedback signal to control the vertical angle of the galvo mirror 540 to correct any vertical error indicated in the measurement. In implementations, this correction can lead to a small amplitude (microjog) correction signal to the vertical galvo 540 for that scan line.

The beam spot size for each excitation beam 120 on the screen 101 needs to be controlled to be less than each subpixel size to achieve the desired display resolution and color purity. If the beam spot size is larger than each subpixel, a portion of the beam can spill over into an adjacent fluorescent stripe to excite one or two wrong colors and reduce the amount of fluorescent light emitted in that subpixel. These effects can degrade the image quality such as the image resolution and color saturation. The focusing of a scanning excitation beam in a scanning display system can set an optimal focusing condition at the factory. This factory focusing setting, however, can change due to variations in temperature and other factors. Therefore, a beam focusing servo control can be implemented to maintain the proper beam focusing. This can be achieved by, for example, providing one or more focus sensing mark located in a peripheral reference mark region, a corresponding optical detector and a focusing feedback control.

Figure 13:
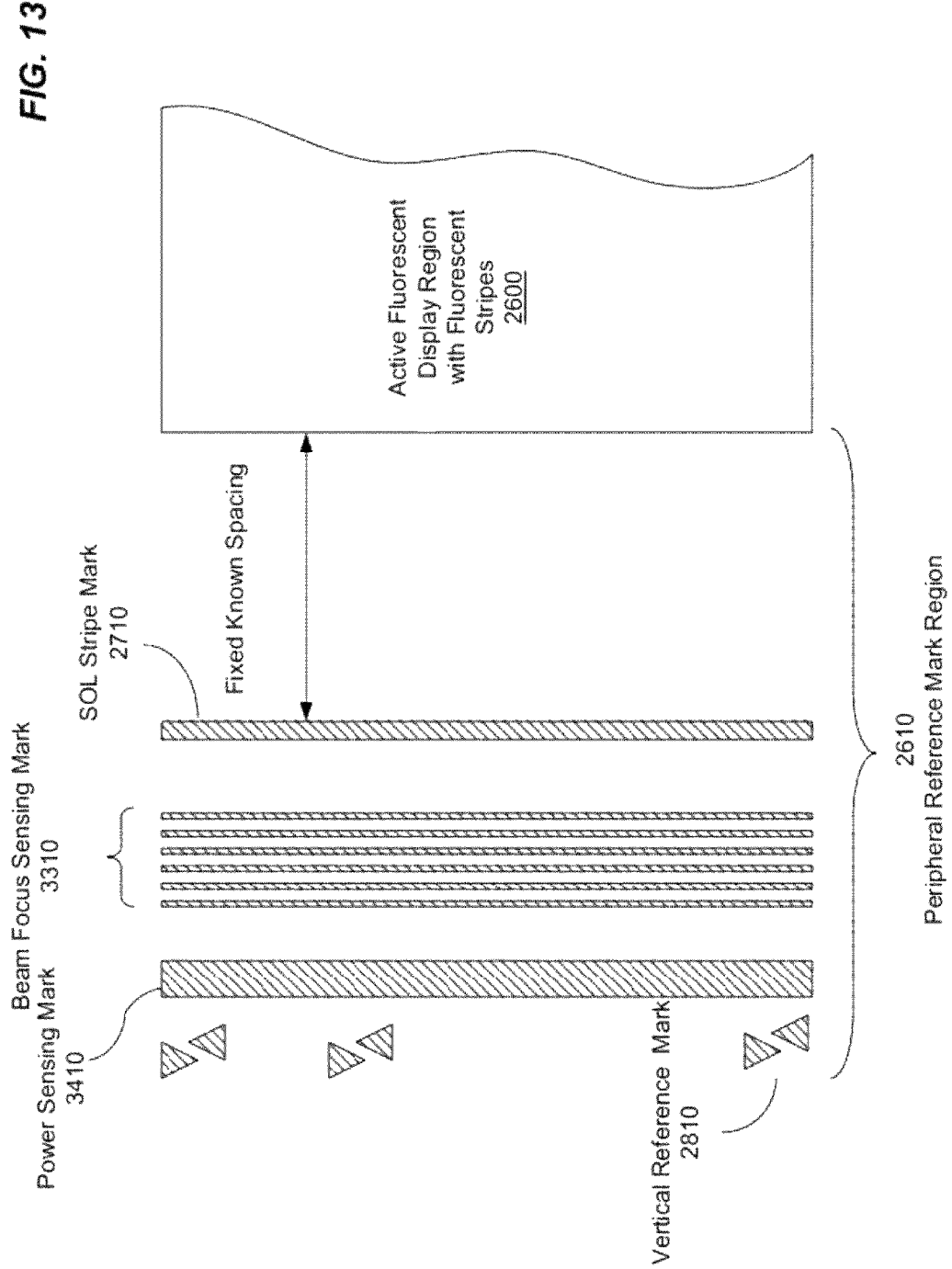
FIG. 13 shows one implementation of the screen in FIG. 11 that includes various reference marks including a power sensing mark for monitoring the optical power of the excitation beam on the screen.

A power sensing mark may also be provided in the peripheral reference mark region on the screen 101 to direct a portion of the scanning excitation beam 120 into a detector to monitor the laser power. This feature can be used to monitor the laser power dynamically during operation. FIG. 13 shows a wide vertical stripe parallel to the fluorescent stripes as the power sensing mark 3410.

FIG. 13 further shows examples of reference marks in the peripheral reference mark region 2610. Other reference marks are also shown in the region 2610. In operation, the laser is turned on in a CW mode with a predetermined drive current prior to passing over the power sensing mark 3410. The driving currents of the laser can varied when measuring the laser power in different scan lines to allow real time mapping of the power-current curve of the laser. The power measurements obtained from multiple scan lines can be averaged to reduce noise in the detection.

One way to correct the horizontal misalignment in the above display systems in FIGS. 8 and 10 is to program the display processor in the laser module 110 to delay the modulated image signal carried by the modulated laser beam 120 by one sub color pixel time slot if the green detector has an output and red and blue detectors have no output or by two sub color pixel time slots if the blue detector has an output and red and green detectors have no output. This correction of a spatial alignment error by a time delay may be achieved digitally within the display processor. No physical adjustment in the optical scanning and imaging units in the laser module 110 is needed. Alternatively, the optical imaging units and the scanning units in the laser module 110 may be adjusted to physically shift the position of the excitation beam 120 on the screen 101 so that the laser position on the screen 101 is adjusted horizontally to the left or right by one sub pixel in response to the error detected by the on-screen optical sensing unit 810. The optical alignment by physically adjusting the scanning laser beam 120 and the electronic or digital alignment by controlling the timing of optical pulses can be combined to control the proper horizontal alignment. A test pattern can be used to check the horizontal alignment in the display systems in FIGS. 8 and 10. For example, a frame of one of the red, green and blue colors may be used as a test pattern to test the alignment.

In the above servo control examples in FIGS. 8, 9 and 10, the on-screen or off-screen optical sensing unit detects the individual colored signals. In various implementations, it may be convenient to use scattered or reflected light of the scanning excitation beam 120 incident to the screen 101 to detect the alignment between the excitation beam and the fluorescent stripes of the screen 101. The above described servo reference marks are peripheral servo reference marks located outside the fluorescent area of the screen. The following sections further describe pixel-level servo reference marks in the fluorescent area of the screen that are used to determine the location of a beam relative to the center of an individual subpixel on the screen.

The periodic structure of the fluorescent stripes or periodic features formed on the periodic structures of the fluorescent stripes can be used as servo reference marks which scatter or reflect a portion of the scanning excitation beam 120 and the scattered or reflected light from such servo reference marks is detected to measure the presence of the misalignment and the direction of the misalignment. A temporal variation in timing of optical pulses is superimposed onto the scanning excitation optical beam 120 and the optical detection of the position of the beam on the screen is achieved by measuring the scattered or reflected light of the scanning excitation beam 120 by the servo reference marks. The information of the beam position on the screen 101 with respect to the periodic servo reference marks is used to control the alignment of the beam on the screen 101.

For example, a servo feedback control of a scanning beam display system can be implemented as follows. A beam of excitation light modulated with optical pulses is projected onto on a screen with parallel fluorescent stripes and is scanned in a beam scanning direction perpendicular to the fluorescent stripes to excite each fluorescent stripe to emit visible light which forms images. A temporal variation, e.g., the periodic temporal variation, is applied to the timing of the optical pulses in the beam of excitation light to advance or delay a spatial position of each optical pulse along the beam scanning direction on the screen. The reflection of the beam of excitation light from the screen is detected to produce a monitor signal which varies with a position of the beam relative to each fluorescent stripe. The information in the monitor signal is used to indicate a spatial offset of an optical pulse relative to a center of an intended or targeted fluorescent stripe along the beam scanning direction perpendicular to the fluorescent stripes. Based on the spatial offset, the timing of the optical pulses in the beam of excitation light is adjusted to reduce the spatial offset.

This servo feedback control may be implemented in various ways. A scanning beam display system with this servo feedback control can include an optical module operable to produce a scanning beam of excitation light which carries optical pulses that are sequential in time and carry image information; a screen comprising parallel fluorescent stripes which absorb the excitation light and emit visible light to produce images carried by the scanning beam; an optical sensor positioned to receive scattered or reflected excitation light by the screen and to produce a monitor signal indicating a spatial alignment of the beam relative to the screen; and a feedback control unit in communication with the optical sensor and operable to control the optical module so as to adjust timing of the optical pulses carried by the beam of excitation light in response to the monitor signal. In this system, the optical module can be used to create a temporal variation in timing of the optical pulses in the beam. The screen can include periodic spatial features that modify the portion of the scattered or reflected light of the excitation light received by the optical sensor in relation with the temporal variation in timing of the optical pulses in the beam. The feedback control unit can adjust the timing of the optical pulses in response to information in the monitor signal that is caused by the modification by the screen in the received portion of light by the optical sensor and temporal variation.

Figure 14:
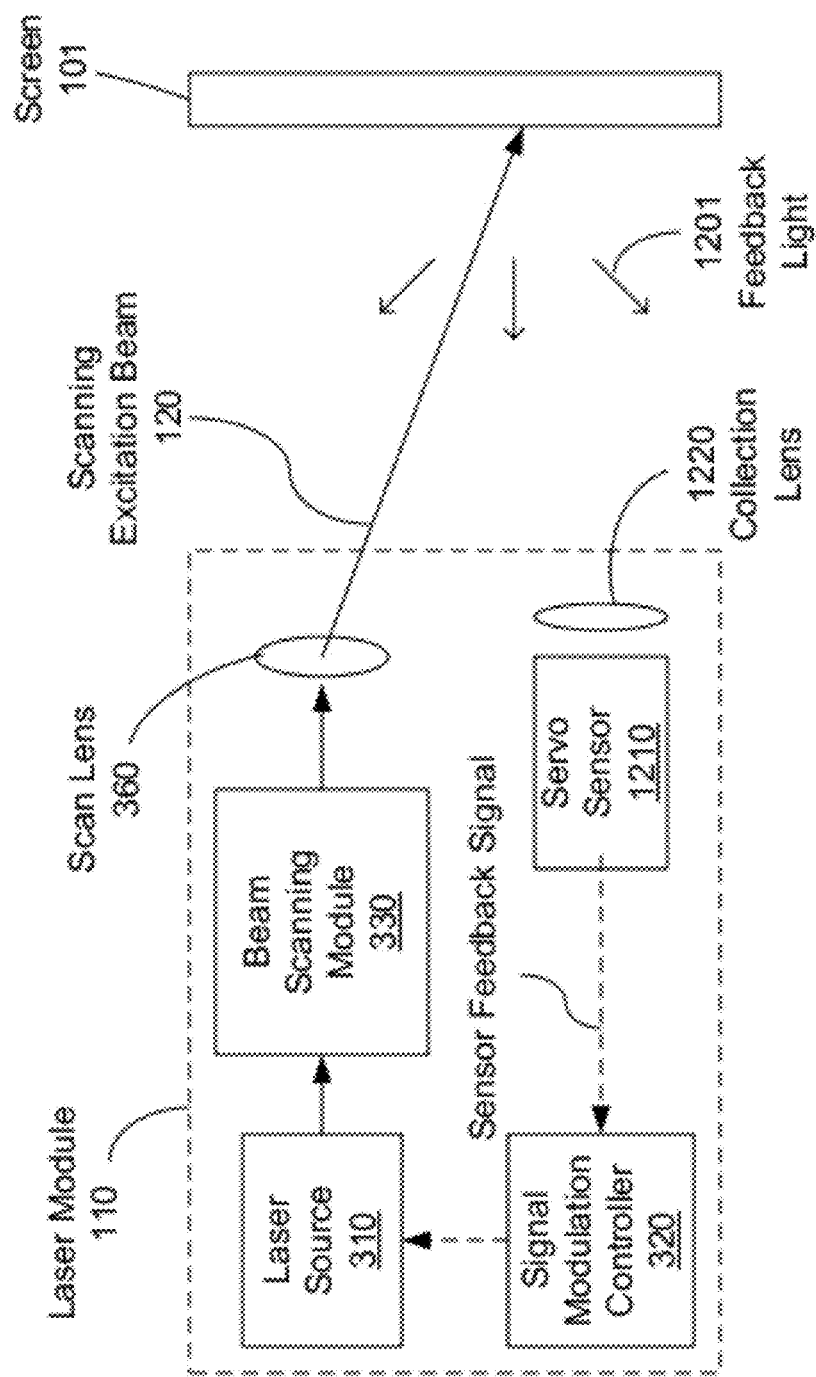
FIG. 14 shows one example of a scanning display system with servo feedback control based on servo reference marks on the screen and a temporal variation on the timing of the optical pulses in the excitation beam.

FIG. 14 shows one example of such a scanning display system with servo feedback control based on the scanning display system in FIG. 3. The scanning display system in FIG. 4 can also be implemented with this servo feedback control. In FIG. 14, the signal modulation controller 320 superimposes a temporal variation on the timing of the optical pulses in the excitation beam 120 in control the modulation of the excitation beam 120. Periodic servo reference marks are provided on the screen 101 to produce feedback light 1201 that is either the scattered or reflected light of the scanning excitation beam 120 caused by the servo reference marks or fluorescent light emitted by the servo reference marks under the optical excitation of the scanning excitation beam 120. An optical servo sensor 1210 is provided, e.g., an off-screen optical detector, to collect the feedback light 1201 from the screen 101. More than one optical servo sensor 1210 can be used. An optical servo sensor 1210 can be located at a suitable location off the screen 101 to maximize the collection of the feedback light from the screen 101, for example, a location near the scan lens 560 in the system in FIG. 5. A collection lens 1220 may be placed in front of the optical servo sensor 1210 to facilitate collection of light. The output of the optical servo sensor 1210 is used as servo feedback signal and is fed to the signal modulation controller 320. The signal modulation controller 320 processes the servo feedback signal to determine the position offset of an optical pulse from a center of a fluorescent stripe and then adjust the timing of optical pulses in the scanning excitation beam 120 to reduce the position offset.

The periodic servo reference marks on the screen 101 can be in various configurations. Referring to FIGS. 2A, 2B and 2C, the stripe dividers between the fluorescent stripes can be used as the servo reference marks. Each stripe divider may include an additional structure as a servo reference mark.

In the present scanning systems, one beam is used to deliver the different colors at one color pixel on a display in order to accurately target the color elements. For screens where phosphors are arranged as parallel vertical stripes, the excitation laser beam is used to activate phosphors of the three primary colors, and as the beam scans across the phosphors, the beam activates each color sequentially in time. The targeting issue in space thus becomes a timing issue in controlling timing of the laser pulses. The variations of the system components due to temperature, aging and other factors and the component and device tolerances during the manufacturing thereof need to be accounted for the timing control of the laser beam on the screen. For example, thermal expansion effects, and distortions in the optical imaging will need corresponding adjustments in the precise timing to activate each color in a pixel. If the laser actuation does not properly correspond to the timing where the beam is directed with the central portion of a sub-pixel and is crossing the intended phosphor, the beam will either partially or completely activate the wrong color phosphor.

In addition to the servo control, a calibration "map" of timing adjustments can be provided to assist the servo control for correcting the timing over different portions of the screen. This calibration map includes beam alignment data for all sub-pixels on the screen and can be obtained using the servo control to measure alignment of the entire screen after the assembly of the display system is completed at the factory. This map of adjustments can be stored in the memory of the laser module 110 and reused for an interval of time if the effects that are being compensated for do not change rapidly. In operation, when the display system is turned on, the display system can be configured to, as a default, set the timing of the laser pulses of the scanning laser beam based on the alignment data in the calibration map and the servo control can operate to provide the real-time monitoring and control of the pulse timing during the operation. Additional calibration measurements may be made to update the stored calibration map in the memory. For example, a single or multiple consecutive versions of this map could be placed in the same memory that is used for buffering pixel color data. These calibration maps may be encoded to reduce both the amount of memory they occupy and the bandwidth of memory needed to access them. For the case of smoothly changing timing adjustments, a simple scheme such as delta modulation can be used effectively to compress these maps.

The calibration "map" can be obtained by operating each scanning laser beam 120 in a continuous wave (CW) mode for one frame during which the scanning laser beams simultaneously scan through the entire screen, one segment at a time, when multiple lasers are used as shown in FIG. 5. If a single laser is used, the single scanning beam is set in the CW mode to scan the entire screen, one line at a time. The feedback light from the servo reference marks on the stripe dividers is used to measure the laser position on the screen. The monitor signal from the photo detector can be sent through an electronic "peak" detector that creates a pulse whenever the monitor signal is at its highest relative amplitude. The time between these pulses can be measured by a sampling clock in a digital circuit or microcontroller that is used to process and generate the error signal. Because the scan speed of the scanning beam on the screen is known, the time between two adjacent pulses from the electronic peak detector can be used to determine the spacing of the two locations that produce the two adjacent pulses. This spacing can be used to determine the subpixel width and subpixel position. Depending on the beam scan rate and the frequency of the sampling clock, there are some nominal number of clocks for each sub-pixel. Due to optical distortions, screen defects or combination of these the distortions and defects, the number of clocks between two adjacent pulses for any given sub-pixel may vary from the nominal number of clocks. This delta can be encoded and stored in memory for each sub-pixel.

Various configurations can be used for generation of static and dynamic servo control signals using fluorescent light emitted by the fluorescent screen for controlling the timing of laser pulses in a scanning beam and alignment of the laser pulses on the screen.

For example, the servo control is used to align the laser clock or the timing of laser pulses to illuminate the correct color sub-pixels on the screen as a laser beam is scanned along a horizontal scan across the fluorescent stripes on the screen. In the normal operation of such a system, a laser is pulsed to deliver optical pulses to selected subpixels on the screen to render images to be displayed by the fluorescent light generated by the fluorescent materials on the screen. The pulse amplitude, the pulse width or both can be controlled to produce a proper level of excited fluorescent luminance at each sub-pixel. The servo control is used to center a laser pulse on the center of a target subpixel to avoid illuminating an adjacent subpixel next to the target subpixel.

In some implementations, the servo control can include an error detection mechanism that detects the error in timing or alignment of the laser pulses with respect to the subpixels on the screen and a feedback control mechanism that reduces the detected error. For example, in the servo control in correcting the timing of the laser pulses, the control can be accomplished by varying the laser clock timing relative to a reference point along the horizontal direction, e.g., the peripheral reference mark for the start-of line (SOL). The error detection can be achieved by detecting and observing the relative amplitudes of Red, Green and Blue light coming from the fluorescent screen under excitation by the laser pulses.

Two different servo controls may be implemented: a static servo control and a dynamic servo control. The static servo feedback algorithm is performed once at the power-on of the display system before the system begins the normal display of the images on the screen. The display system is controlled to perform the initial clock calibration to align the laser pulses to the sub-pixel center positions. The dynamic servo feedback algorithm is performed after the initial power on of the system and can be, for example, continuously performed during the normal operation of the display system. This dynamic servo feedback keeps the pulses timed to the subpixel center position against variations in temperature, screen motion, screen warping, system aging and other factors that can change the alignment between the laser and the screen. The dynamic servo control is performed when the video data is displayed on the screen and is designed in a way that it is not apparent to the viewer. As described above, the laser beams are controlled to have a periodic delay signal which causes the laser pulses to be positively and negatively delayed in a periodic fashion in the time domain. As an example, the laser pulses can be advanced in phase by, e.g., one clock cycle of the clock in the servo digital circuit or microprocessor for one horizontal scan, and delayed in phase by, e.g., one clock cycle on the subsequent scan. In some implementations, the clock cycle of the servo digital circuit can be set so that the width of a subpixel corresponds to a scanning distance on the screen over 10 clock cycles, e.g., 16-20 clock cycles per subpixel. As an example, the duration of one clock cycle may be a few nanoseconds.

Various implementations of servo control mechanisms for scanning beam display systems are described in U.S. patent application Ser. No. 11/515,420 entitled "Servo-Assisted Scanning Beam Display Systems Using Fluorescent Screens" filed on Sep. 1, 2006 (US patent publication no. 2007-0188417 A1) and PCT Application No. PCT/US2007/004004 entitled "Servo-Assisted Scanning Beam Display Systems Using Fluorescent Screens" and filed on Feb. 15, 2007 (PCT publication No. 2007/095329), both of which are incorporated by reference as part of the specification of this application.

In the above examples of scanning beam displays, the scanning lens 530 is located downstream from the beam scanning devices 540 and 550 and focuses the one or more scanning excitation beams 120 onto the screen 101, either directly or via a folded optical path through one or more reflectors placed between the scan lens 530 and the screen 101. This optical configuration is referred to as a "pre-objective" scanning system. In such a pre-objective design, a scanning beam directed into the scan lens 360 is scanned along two orthogonal directions. Therefore, the scan lens 360 is designed to focus the scanning beam onto the screen 101 along two orthogonal directions. In order to achieve the proper focusing in both orthogonal directions, the scan lens 360 can be complex and, often, are made of multiples lens elements. In one implementation, for example, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. In such a f-theta lens, the location of the focal spot on the screen is a proportional to the input scan angle (theta).

The two-dimensional scan lens 360 such as a f-theta lens in the pre-objective configuration can exhibit optical distortions along the two orthogonal scanning directions which cause beam positions on the screen 101 to trace a curved line. Hence, an intended straight horizontal scanning line on the screen 101 becomes a curved line. The distortions caused by the 2-dimensional scan lens 360 can be visible on the screen 101 and thus degrade the displayed image quality. One way to mitigate the bow distortion problem is to design the scan lens 360 with a complex lens configuration with multiple lens elements to reduce the bow distortions. The complex multiple lens elements can cause the final lens assembly to depart from desired f-theta conditions and thus can compromise the optical scanning performance. The number of lens elements in the assembly usually increases as the tolerance for the distortions decreases. However, such a scan lens with complex multiple lens elements can be expensive to fabricate.

To avoid the above distortion issues associated with a two-dimensional scan lens in a pre-objective scanning beam system, the following sections describe examples of a post-objective scanning beam display system, which can be implemented to replace the two-dimensional scan lens 360 with a simpler, less expensive 1-dimensional scan lens.

Figure 15:
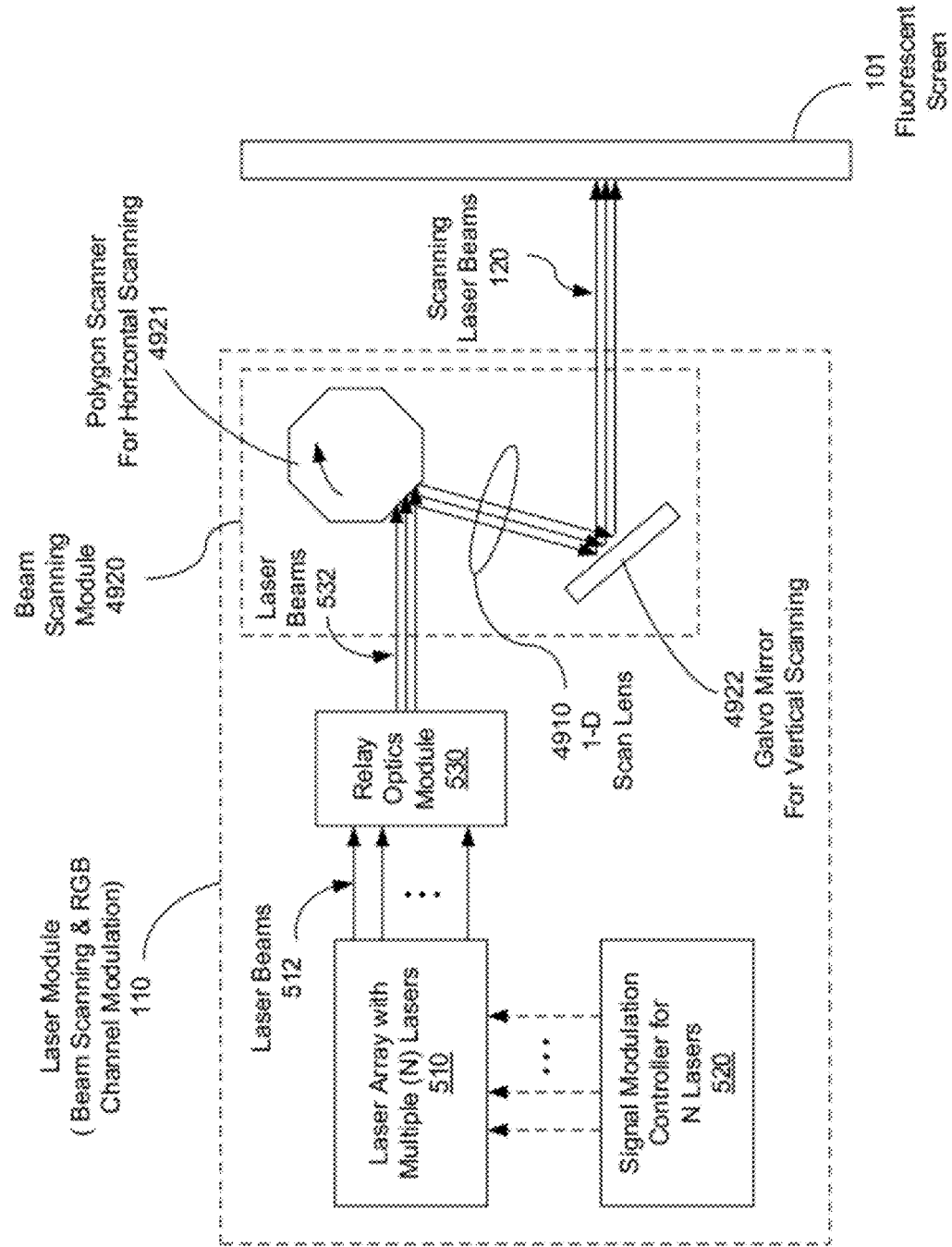
FIG. 15 shows an example of a post-objective scanning beam display system based on the system design in FIG. 1.

FIG. 15 shows one example of a pre-objective scanning beam system based on the display design in FIG. 1. In this example, a relay optics module 530 reduces the spacing of laser beams 512 to form a compact set of parallel laser beams 532 that spread within the facet dimension of the polygon scanner 4921 for the horizontal scanning. Downstream from the polygon scanner 4921, there is a 1-D horizontal scan lens 4910 followed by a vertical scanner 4922 (e.g., a galvo mirror) that receives each horizontally scanned beam 532 from the polygon scanner 4921 through the 1-D scan lens 4910 and provides the vertical scan on each horizontally scanned beam 532 at the end of each horizontal scan prior to the next horizontal scan by the next facet of the polygon scanner 4921. Under this optical design of the horizontal and vertical scanning, the 1-D scan lens 4910 is placed downstream from the polygon scanner 4921 and upstream from the vertical scanner 4922 to focus each horizontal scanned beam on the screen 101 and minimizes the horizontal bow distortion to displayed images on the screen 101 within an acceptable range, thus producing a visually "straight" horizontal scan line on the screen 101. Such a 1-D scan lens 4910 capable of producing a straight horizontal scan line is relatively simpler and less expensive than a 2-D scan lens of similar performance. Downstream from the scan lens 4910, the vertical scanner 4922 is a flat reflector and simply reflects the beam to the screen 101 and scans vertically to place each horizontally scanned beam at different vertical positions on the screen 101 for scanning different horizontal lines. The dimension of the reflector on the vertical scanner 4922 along the horizontal direction is sufficiently large to cover the spatial extent of each scanning beam coming from the polygon scanner 4921 and the scan lens 4910. The system in FIG. 15 is a post-objective design because the 1-D scan lens 4910 is upstream from the vertical scanner 4922 and there is no lens or other focusing element downstream from the vertical scanner 4922.

Figure 16:
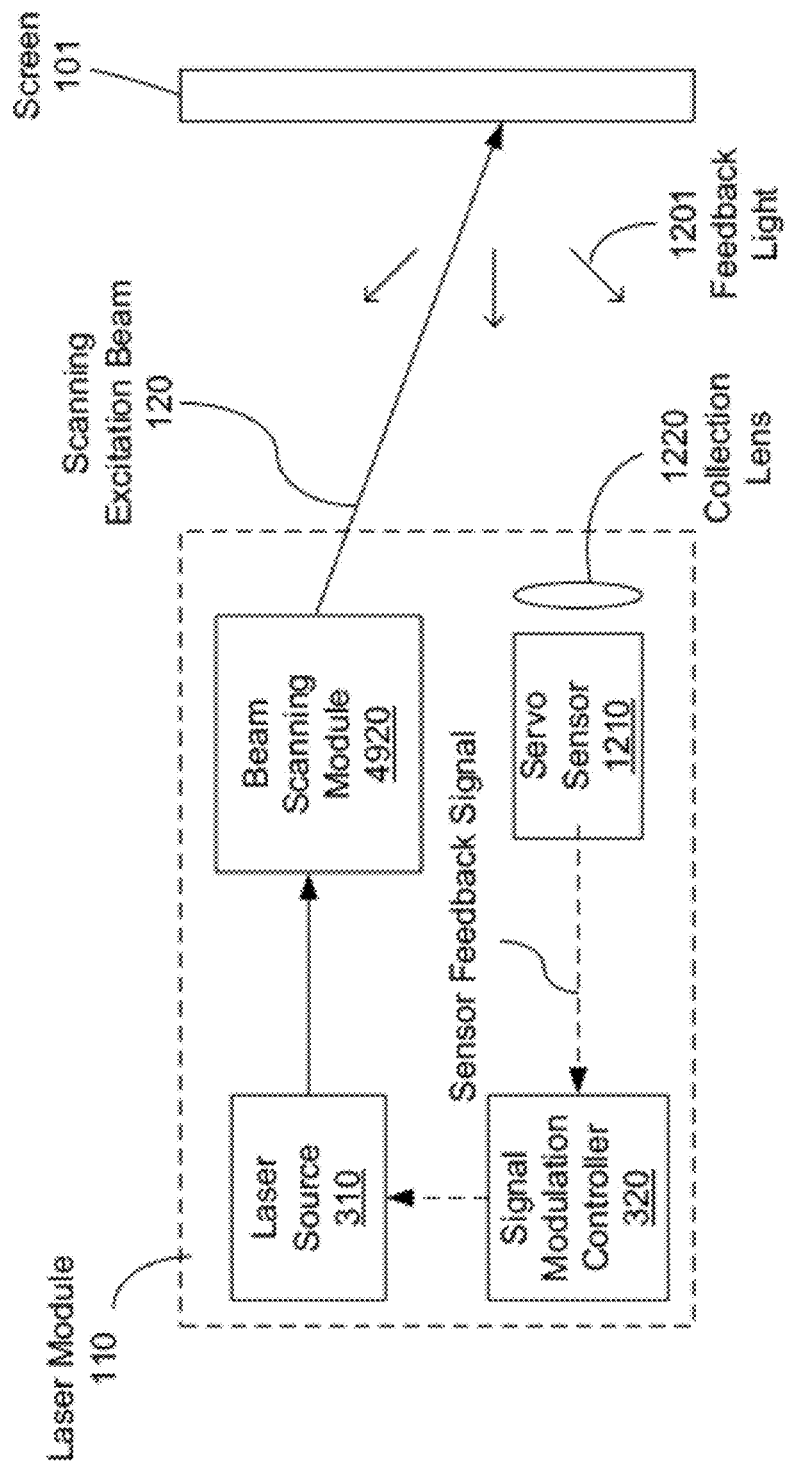
FIG. 16 shows a servo-assisted post-objective scanning beam display based on the design in FIG. 15.

The post-objective scanning beam display in FIG. 15 can incorporate various screen designs, reference marks on the screen 101 and the servo feedback control described in this application. For example, FIG. 16 illustrates adding the servo feedback control to the system in FIG. 15 by having a servo sensor 1210 to collect feedback light 1201 from the screen 101. A collection lens 1220 may be used to enhance the collection of light by the servo sensor 1210. In various implementations in both post-objective and pre-objective scanning beam displays, the servo sensor 1210 may include one or more optical detectors located close to the excitation side of the screen 101 to enhance the collection of light.

The above examples of post-object scanning beam systems use a polygon scanner for horizontal scanning as the first beam scanner placed upstream from the scan lens and a vertical scanner such as a galvo mirror as the second beam scanner for vertical scanning downstream from the scan lens. In other implementations, the first beam scanner located upstream from the scan lens is a vertical scanner for vertical scanning, such as a galvo mirror, and the second scanner downstream from the scan lens is a polygon scanner for horizontal scanning. This configuration can be designed to use a small glavo reflector and thus avoid a large downstream galvo reflector with a dimension along the horizontal scanning direction of the upstream polygon needed for the post-objective system in FIG. 15. A large glavo reflector can require more power to operate than a small galvo reflector and its dynamic range may be limited due to the larger mass in comparison with a small galvo reflector. In this system, the distortion pattern is rotated relative to the other one and is preferable for RGB vertical lines because strong distortion in the vertical direction makes the spot rotate which means effectively a wider spot.

Figure 17:
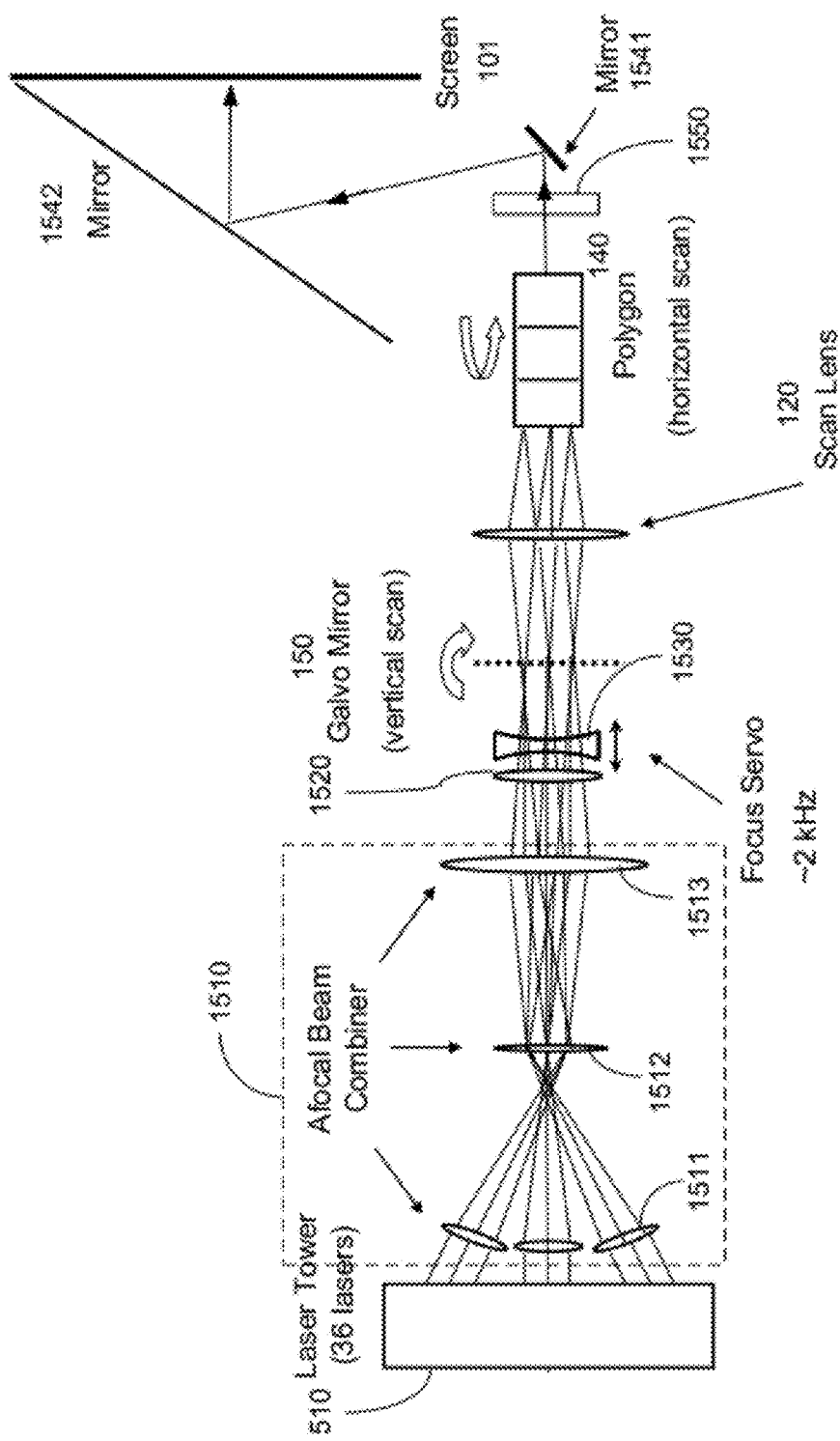
FIG. 17 shows an example of a laser scanning display system based on multiple lasers in a laser array.

FIG. 17 shows show an example of a laser scanning display system based on multiple lasers in a laser array 510. This scanning beam display system includes lasers forming a laser array 510 to produce multiple laser beams, respectively, a beam scanning module with two scanners 150 and 140 placed in an optical path of the laser beams to scan the laser beams in two orthogonal directions onto the screen 101; and an afocal optical relay module 1510 placed between the lasers and the scanning module to include lenses to reduce a spacing between two adjacent laser beams and to overlap the laser beams at the scanning module. Mirrors 1541 and 1542 are placed in the optical path between the polygon scanner 140 and screen 101 to fold the optical path with a small optical depth.

In one implementation, the afocal optical relay module can include a first lens having a first focal length to receive and focus the laser beams from the lasers; a second lens having a second focal length shorter than the first focal length and spaced from the first lens by the first focal length to focus the laser beams from the first lens; and a third lens having a third focal length longer than the second focal length and spaced from the second lens by the third focal length to focus and direct the laser beams from the second lens to the scanning module. Examples for the afocal optical module 1510 and the optical relay module 530 are described in PCT application No. PCT/US2006/041584 entitled "Optical Designs for Scanning Beam Display Systems Using Fluorescent Screens" and filed on Oct. 25, 2006 (PCT publication no. WO 2007/050662) and U.S. patent application Ser. No. 11/510, 495 entitled "Optical Designs for Scanning Beam Display Systems Using Fluorescent Screens" and filed on Aug. 24, 2006 (U.S. publication no. US 2007-0206258 A1), which are incorporated by reference as part of the specification of this application.

In FIG. 17, the laser beams are controlled to overlap in a single plane (i.e., the pupil plane). A single-axis scanning scanner upstream from the scan lens 120, e.g., a galvo mirror, is located in the pupil plane and is used to scan all beams along one axis, which is the vertical direction in this example. The scan lens 120 can be a multi-function scan lens which is designed to have a sufficiently large field-of-view to accept the full angular range of the scanned beams from the upstream vertical scanner 150 (e.g., the galvo mirror). The scan lens 120 is a converging lens which brings the beams to focus at the screen 101. The scan lens 120 is also used to image the galvo mirror 150 onto the polygon reflecting facet on the downstream polygon scanner 140. This imaging function allows the polygon 140 to be relatively small. Without imaging, the polygon would be relatively large because the scanned beams naturally spread with increasing distance from the galvo mirror 140. The scan lens 120 in FIG. 15 is illustrated as a single-element lens. Such a lens 120 can be designed to include multiple lens elements in order to perform its functions, e.g., focusing and re-imaging over the scanning range of the galvo mirror 140.

Downstream from the scan lens 120, the polygon scanner 140 scans the converging beams from the scan lens 120 onto the screen 101. The foci of the converging beams can, in general, lie on a curved surface. A focus servo is used to refocus the beams dynamically on to a planar surface of the screen 101. In this example, the focus servo includes at least two lens elements 1520 and 1530 that are separated by an air gap as shown. One of the two lenses (e.g., lens 1520) has a positive focal length and the other (e.g., lens 1530) has a negative focal length. An actuator is provided to control the relative spacing between the two lenses 1520 and 1530. The beams entering and exiting the focus servo are nominally collimated when the lenses comprising the focus servo are separated by a prescribed distance (i.e., the neutral or nominal position). In the example shown in FIG. 17, one lens of the focus servo is stationary and the other is moved axially to allow dynamic refocusing of the beams. The movable lens (e.g., lens 1530) is moved about its nominal position by a distance sufficient to bring the beams to focus on the screen 101.

In the above post-objective systems, the output 2-D scanning beam can have optical distortions. For example, there can be "bow" distortions in the horizontal direction in the images projected onto the screen. A distortion correcting optical module 1550 with multiple lens elements can be provided in the optical path between the polygon scanner 150 and the screen 101 to reduce the optical distortions.

Various implementations of post-objective scanning systems are described in U.S. patent application Ser. No. 11/742,014 entitled "POST-OBJECTIVE SCANNING BEAM SYSTEMS" filed on Apr. 30, 2007 and PCT Application No. PCT/US2008/057763 entitled "POST-OBJECTIVE SCANNING BEAM SYSTEMS" and filed Apr. 7, 2008, both of which are incorporated by reference as part of the specification of this application.

In the above examples, the post-objective and pre-objective scanning beam systems are used in display systems. Such scanning systems can also be used in other optical systems that use scanning beams to produce optical patterns. For example, laser printing systems can also use the above described post-objective and pre-objective scanning systems where the screen 101 is replaced by a printing medium (e.g., paper, fabric, or a master printing plate). Referring to FIG. 15, for example, a laser printing system can be constructed based on the post-objective scanning design. A printing medium is used to receive the one or more scanning laser beams 120 that carry the images to be formed on the print medium. The images carried by the light 120 can be formed on the printing medium based various photo effects, e.g., photomechanical, photochemical, or laser engraving processes. The printing medium can be a printing plate which is then used to transfer the images onto paper or other printing materials. The lasers in the laser array 511 can be implemented by lasers such as diode lasers that emit at a proper wavelength for the laser printing operation on the printing medium.

In one implementation, the above described alignment features of the fluorescent screen 101, including the stripe alignment reference marks (e.g., reflectors or light-emitting marks) on the stripe dividers, various peripheral reference marks in the peripheral reference mark region 2610 or 2620 on the screen 101 in FIG. 11, can be fabricated on a reference plate or alignment plate with the same dimension and shape of the printing medium to assist alignment between the laser module and the printing medium and for system calibration, where the display region 2600 in FIG. 11 for the screen 101 corresponds to a central printing area on the alignment plate. The alignment plate can be first placed at the location of the printing medium to perform alignment and calibration using the reference marks on the alignment plate. Next, the alignment plate is replaced by the actual printing medium to expose the printing medium to the image-carrying light 120 so that the images are printed on the printing medium.

Figure 18:
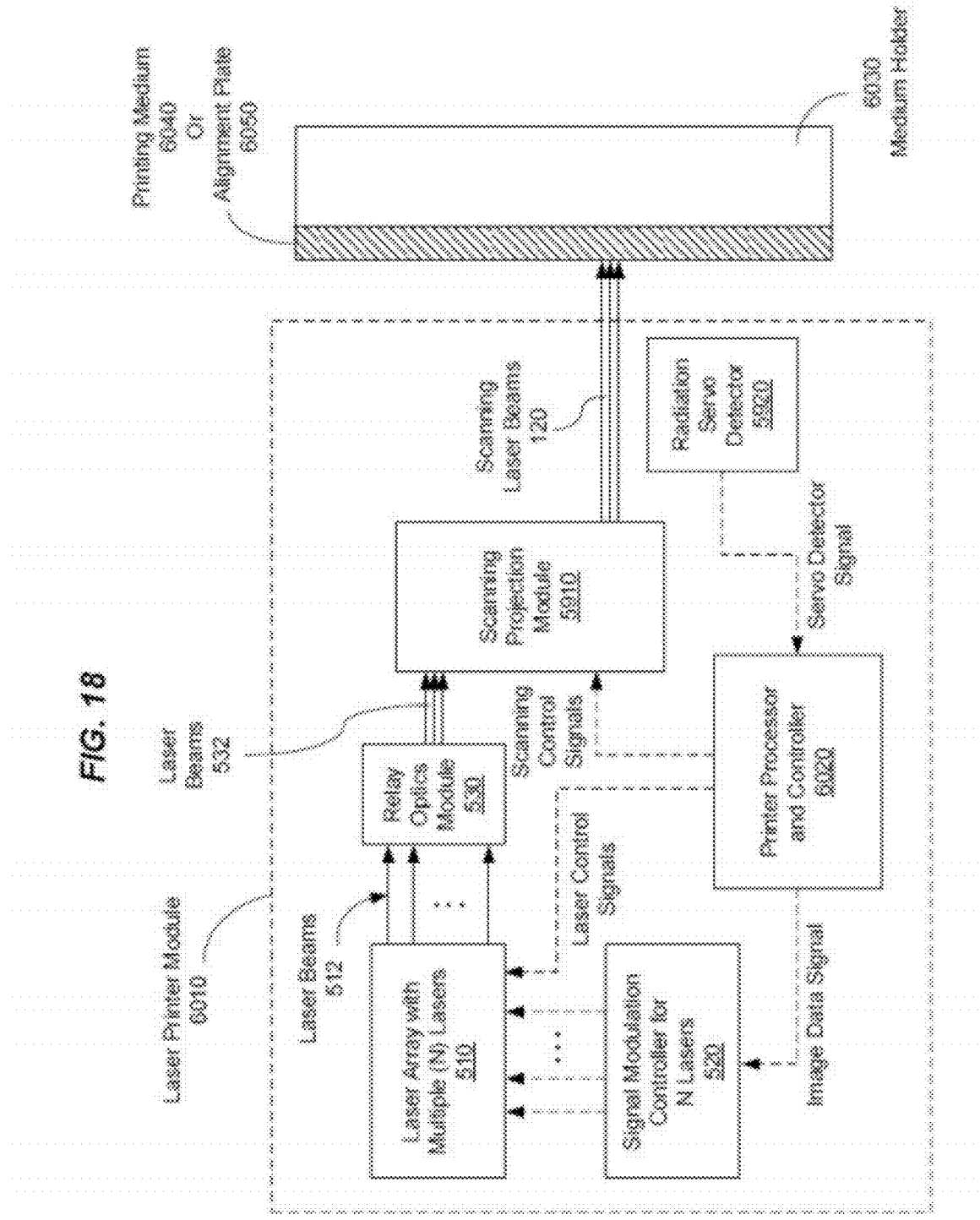
FIG. 18 shows an example of a scanning beam printing system based servo feedback from an alignment plate.

FIG. 18 illustrates an example of such a printing system where the laser printer module 6010 includes printer processor and controller 6020 as the central control. A medium holder 6030 is provided to hold either the printing medium 6040 or the identically shaped and sized alignment plate 6050. The alignment plate 6050 can include stripe structures similar to the stripe structures in the screen 101 to define image pixels of an image to be printed on the printing medium 6040 and to provide servo feedback on the timing or horizontal positioning information of the optical pulses. The alignment plate 6050 can include other peripheral reference marks such as the vertical position sensing marks, the start-of-line reference mark, and others.

Figure 19:
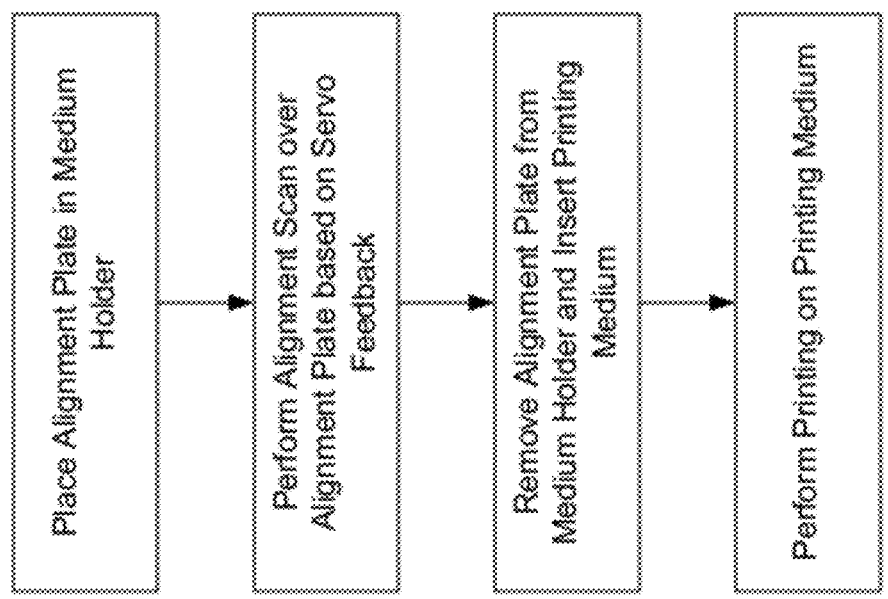
FIG. 19 shows operations of the system in FIG. 17.

Under this design, the printer system in FIG. 18 is operated to perform an alignment process prior to a printing process as shown in FIG. 19. First, the alignment plate 6050 is placed in the medium holder 6030 of the system. One or more alignment scans of the laser beams 120 are performed based on the servo reference marks on the alignment plate 6050. Next, the alignment plate is removed and is replaced by the actual printing medium. Because the printing medium is identically shaped and sized as the printing medium, the printing medium is well aligned with the laser printer module. The printer system is then operated to direct the image-carrying beams 120 to the printing medium and to print the images on the printing medium.

Figure 20:
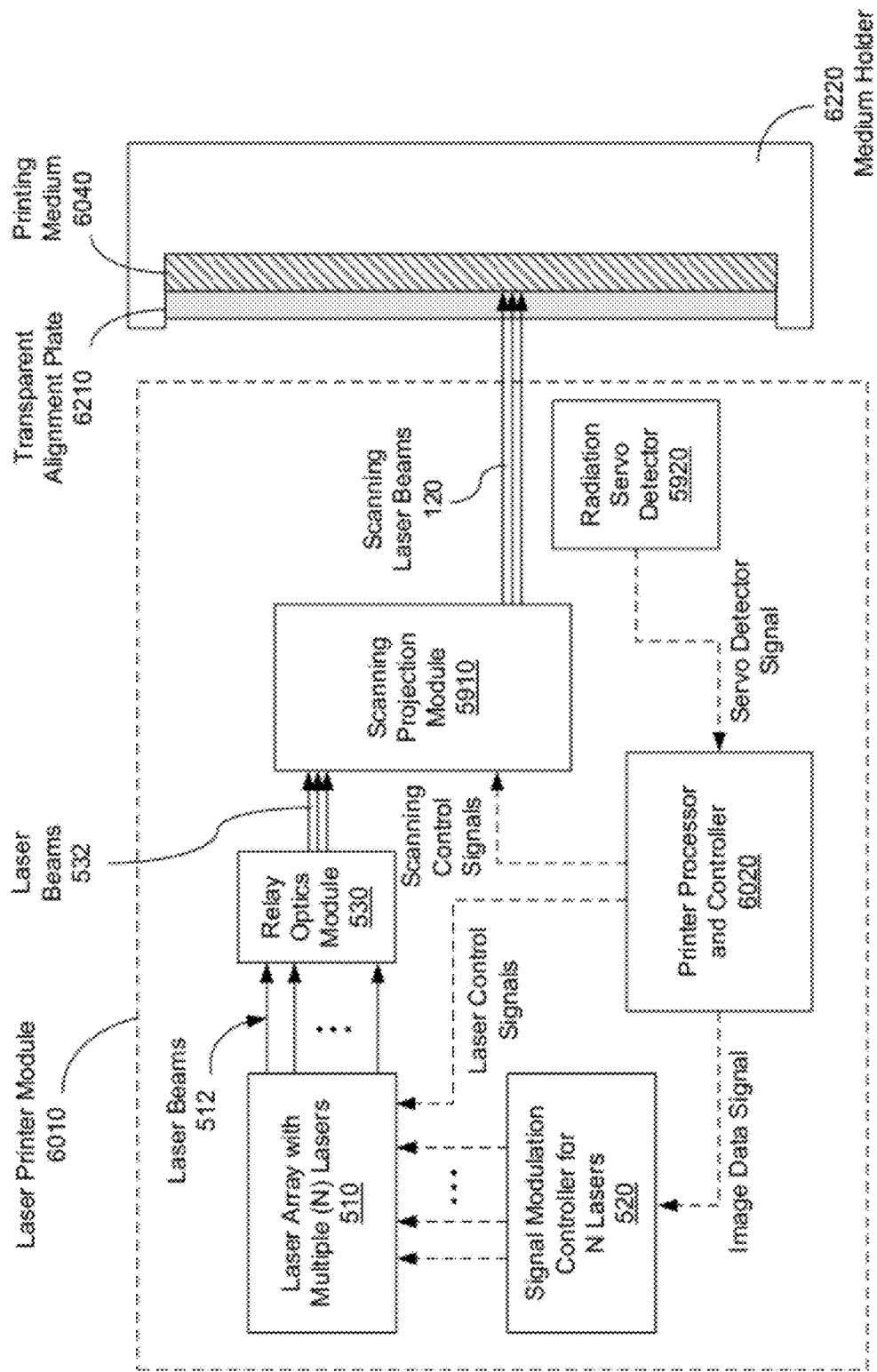
FIG. 20 shows another example of a scanning beam printing system based servo feedback from an alignment plate.

FIG. 20 shows another example of a scanning beam printing system based on a different alignment mechanism. A transparent alignment plate 6210 is designed to include stripe reference marks in the central printing area to generate servo signals for monitoring and correcting timing of laser pulses in a horizontal scan and to include other peripheral reference marks outside the central printing area. The central printing area of the alignment plate 6210 is transparent except for the stripe dividers between pixels which are partially reflective and partially transmissive to produce timing servo signals for the printer system. The stripe dividers between pixels do not interfere with images to be printed on the printing medium. Under this design, the laser beams 120 can transmit through the alignment plate 6210 to reach the printing medium 6040. The medium holder 6220 is designed to hold both the alignment plate 6210 and the printing medium 6040 where the alignment plate 6210 overlays the printing medium 6040. The laser beams 120 first reach the alignment plate 6210 and then transmits through the alignment plate 6210 to print on the surface of the printing medium 6040. The medium holder 6220 can be designed to hold the alignment plate 6210 at a fixed position while allowing the printing medium 6040 to inserted and removed.

The above printing systems use parallel raster scanning of multiple laser beams to print one segment at a time as shown in FIG. 7. This mode of printing allows multiple lines to be simultaneously printed and thus provides high-speed printing capabilities. In addition, the use of the alignment plate provides servo feedback to ensure proper calibration and alignment of the laser beams to ensure accurate and high-quality reproduction of the images on the printing medium. Both static servo control and dynamic servo control described in connection with the display systems can be used for printing systems.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few implementations are disclosed. However, it is understood that variations and enhancements may be made.

What is claimed is:

1. A scanning beam printing system, comprising:
a printing medium holder to hold a printing medium on which images are projected and printed onto the printing medium;
a laser array comprising lasers to produce laser beams having optical pulses to carry image information to be projected on the printing medium held by the printing medium holder;
a scanning and projection module that directs the laser beams from the laser array onto the printing medium holder and simultaneously scans the laser beams along different horizontal scan lines at the printing medium holder and to sequentially scan the laser beams in different vertical regions at the printing medium holder, wherein the scanning and projection module comprises a horizontal polygon scanner to scan the laser beams horizontally, and a vertical scanner to scan the laser beams vertically;
one or more servo detectors located to receive feedback light from the printing medium holder caused by the laser beams; and
a control that controls the laser array, and the scanning and projection module in response to information in output from the one or more servo detectors,
wherein:
the printing medium holder holds an alignment plate and has a medium holding position which holds the printing medium, wherein the alignment plate is disposed in an optical path of the laser beams between the scanning and projection module and the medium holding position so that the laser beams transmit through the alignment plate to reach the printing medium, and
the alignment plate comprises a central transparent printing area that comprises stripe reflectors that define image pixels and reflect light to the one or more servo detectors to indicate a spatial alignment error of each laser beam along a horizontal scan line.

2. The system as in claim 1, wherein:
the alignment plate comprises a peripheral reference mark outside the central transparent printing area to reflect light to the one or more servo detectors to indicate a position of a laser beam on the alignment plate.

3. The system as in claim 1, wherein:
the scanning and projection module comprises a scan lens placed in an optical path of the laser beams between the horizontal polygon scanner and the vertical scanner, and
the vertical scanner is placed downstream from the horizontal polygon scanner along the optical path of the laser beams.

4. The system as in claim 1, wherein:
the scanning and projection module comprises a scan lens placed in an optical path of the laser beams downstream from the horizontal polygon scanner and the vertical scanner.

5. The system as in claim 1, wherein:
the alignment plate includes optical reference marks that produce the feedback light.

6. The system as in claim 5, wherein:
the scanning the projection module is configured to scan the laser beams to the alignment plate to simultaneously trace parallel horizontal lines in one region and to sequentially to scan parallel horizontal lines in different regions along different vertical positions on the alignment plate.

7. The system as in claim 6, wherein
the control is configured to use the information in output from the one or more servo detectors detecting feedback light from the alignment plate to measure a position of each laser beam on the alignment plate.

8. The system as in claim 7, wherein:
the control is configured to use the measured position to adjust at least one of timing of the optical pulses in each laser beam in each horizontal scan and a vertical position of each laser beam on the alignment plate.

* * * * *